(12) United States Patent
Nadakuduti et al.

(10) Patent No.: US 12,500,620 B2
(45) Date of Patent: Dec. 16, 2025

(54) RADIO FREQUENCY EXPOSURE COMPLIANCE

(71) Applicant: QUALCOMM Incorporated, San Diego, CA (US)

(72) Inventors: Jagadish Nadakuduti, Bermuda Dunes, CA (US); Lin Lu, San Diego, CA (US); Paul Guckian, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 588 days.

(21) Appl. No.: 17/952,166

(22) Filed: Sep. 23, 2022

(65) Prior Publication Data
US 2024/0106480 A1    Mar. 28, 2024

(51) Int. Cl.
*H04B 1/3827* (2015.01)
*H04W 52/28* (2009.01)

(52) U.S. Cl.
CPC ........ *H04B 1/3838* (2013.01); *H04W 52/288* (2013.01)

(58) Field of Classification Search
CPC .. H04B 1/3838; H04W 52/288; H04W 52/44; H04W 52/367
See application file for complete search history.

(56) References Cited

U.S. PATENT DOCUMENTS

| | | | |
|---|---|---|---|
| 2018/0288709 A1* | 10/2018 | Yao | H04W 52/367 |
| 2020/0015171 A1 | 1/2020 | Nadakuduti et al. | |
| 2022/0086771 A1 | 3/2022 | Lu et al. | |
| 2022/0159581 A1* | 5/2022 | Lu | H04W 52/262 |

FOREIGN PATENT DOCUMENTS

WO    2022104371 A1    5/2022

OTHER PUBLICATIONS

International Search Report and Written Opinion—PCT/US2023/073021—ISA/EPO—Dec. 5, 2023.

* cited by examiner

*Primary Examiner* — Ayodeji O Ayotunde
(74) *Attorney, Agent, or Firm* — Loza & Loza, LLP/Qualcomm Incorporated

(57) ABSTRACT

In certain aspects, a method for wireless communication includes transmitting a first transmission with a first transmitter operable according to a first radio technology, and transmitting a second transmission with a second transmitter after completion of the first transmission, the second transmitter operable according to a second radio technology. The method may also include delaying transmission of the second transmission by a predetermined wait time after completion of the first transmission if the first radio technology is a radio frequency (RF) exposure time-averaged technology and the second radio technology is a non-time-averaged RF exposure technology. The method may also include transmitting the second transmission with a limited peak power for a predetermined time period for at least a portion of the second transmission if the first radio technology is a non-time-averaged RF exposure technology and the second radio technology is a time-averaged RF exposure technology.

26 Claims, 12 Drawing Sheets

RADIO FREQUENCY EXPOSURE COMPLIANCE

BACKGROUND

Field

Aspects of the present disclosure relate generally to wireless devices, and more particularly, to accounting for radio frequency (RF) exposure from wireless devices and limiting the radio frequency (RF) exposure therefrom.

Background

Modern wireless devices (e.g., cellular phones) are generally required to limit a user's exposure to radio frequency (RF) radiation according to RF exposure limits set by various regulations. To ensure that a wireless device complies with an RF exposure limit, techniques have been developed to enable the wireless device to assess RF exposure from the wireless device in real time and adjust the transmission power of the wireless device, accordingly, to comply with the RF exposure limit.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

A first aspect relates to a wireless device. The wireless device includes multiple transmitters including a first transmitter and a second transmitter, wherein each of the multiple transmitters is configured to transmit signals according to a respective radio technology of multiple radio technologies, and wherein the multiple radio technologies include a first radio technology comprising a time-averaged radio frequency (RF) exposure technology and a second radio technology comprising a non-time-averaged RF exposure technology. The wireless device also includes a processor coupled to the multiple transmitters. The processor is configured to cause the first transmitter to transmit a first transmission, and cause the second transmitter to transmit a second transmission after completion of the first transmission. The processor is further configured to cause the second transmitter to transmit the second transmission subsequent to completion of a predetermined wait time after the completion of the first transmission if the first transmitter is operable according to the first radio technology and the second transmitter is operable according to the second radio technology, and cause the second transmitter to transmit at least a portion of the second transmission with a limited peak power for a predetermined time period after the completion of the first transmission if the first transmitter is operable according to the second radio technology and the second transmitter is operable according to the first radio technology.

A second aspect relates to a method for wireless communications. The method includes transmitting a first transmission with a first transmitter operable according to a first radio technology, and transmitting a second transmission with a second transmitter after completion of the first transmission, the second transmitter operable according to a second radio technology. The method also includes delaying transmission of the second transmission by a predetermined wait time after completion of the first transmission if the first radio technology is a radio frequency (RF) exposure time-averaged technology and the second radio technology is a non-time-averaged RF exposure technology, and transmitting the second transmission with a limited peak power for a predetermined time period for at least a portion of the second transmission if the first radio technology is a non-time-averaged RF exposure technology and the second radio technology is a time-averaged RF exposure technology.

A third aspect relates to a wireless device. The wireless device includes multiple transmitters, wherein each of the multiple transmitters is configured to transmit signals according to a respective radio technology of multiple radio technologies, and wherein the multiple radio technologies include a time-averaged radio frequency (RF) exposure technology and a non-time-averaged RF exposure technology. The wireless device also includes a processor coupled to the multiple transmitters. The processor is configured to set a transmission level limit of the non-time-averaged RF exposure technology to a predetermined back-off level during periods when the time-averaged RF exposure technology is active over a transmission time window, determine an RF exposure profile for the non-time-averaged RF exposure technology over the transmission time window, and control transmission of one of the transmitters operable according to the time-averaged RF exposure technology based on the RF exposure profile.

A fourth aspect relates to a method for wireless communications. The method includes setting a transmission level limit of a non-time-averaged RF exposure technology to a predetermined back-off level during periods when a time-averaged RF exposure technology is active over a transmission time window, determining an RF exposure profile for the non-time-averaged RF exposure technology over the transmission time window, and controlling transmission of a transmitter operable according to the time-averaged RF exposure technology based on the derived RF exposure profile.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
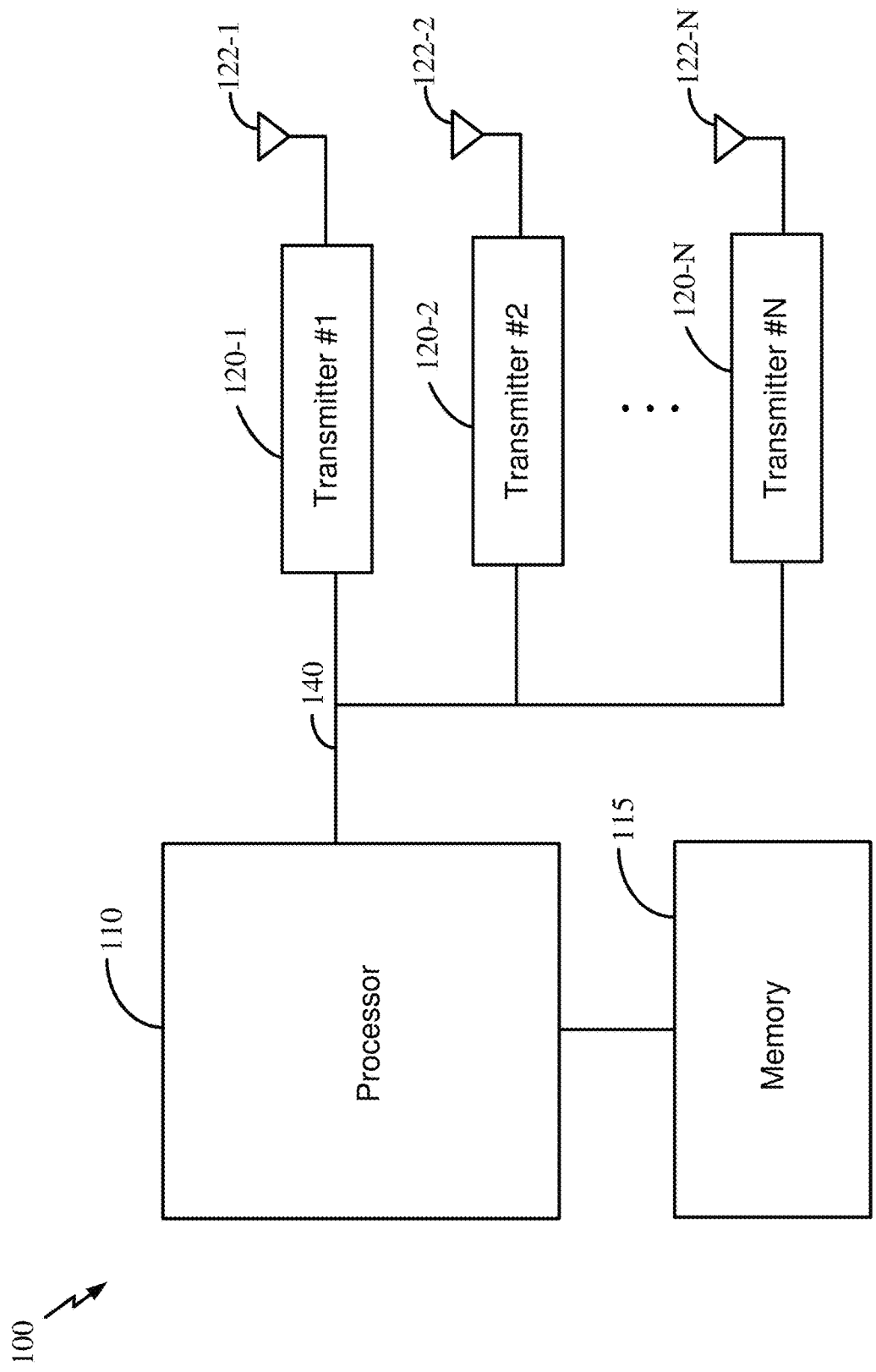
FIG. 1 shows an example of a wireless device in which aspects of the present disclosure may be implemented.

FIG. 1 shows an example of a wireless device 100 in which aspects of the present disclosure described herein may be implemented. The wireless device 100 may comprise a mobile wireless device (e.g., a cellular phone), a laptop, a wireless access point, or some other wireless device.

In particular, the wireless device 100 includes a processor 110, and a memory 115 coupled to the processor 110. The memory 115 may store instructions that, when executed by the processor 110, cause the processor 110 to perform one or more of the operations described herein. The memory 115 may include random access memory (RAM), read only memory (ROM), flash memory such as NAND storage, or any combination thereof. The processor 110 may be implemented with a general-purpose processor, a digital signal processor (DSP), a baseband modem, an application specific integrated circuit (ASIC), a field programmable gate array (FPGA) or other programmable logic device (PLD), discrete gate logic, discrete hardware components, or any combination thereof configured to perform one or more of the operations described herein.

The wireless device 100 also includes multiple transmitters 120-1 to 120-N, multiple antennas 122-1 to 122-N, and a bus 140 coupling the processor 110 and the multiple transmitters 120-1 to 120-N. In the example shown in FIG. 1, the output of each of the transmitters 120-1 to 120-N is coupled to a respective one of the antennas 122-1 to 122-N, and is configured to output a respective RF signal to the respective one of the antennas 122-1 to 122-N for transmission. The antennas 122-1 to 122-N may be arranged in a one-dimensional array, a two-dimensional array, or a three-dimensional array. Each of the antennas 122-1 to 122-N may be implemented with a patch antenna or another type of antenna. The transmitters 120-1 to 120-N may also be referred to as transmit chains or another term, and the antennas 122-1 to 122-N may also be referred to as antenna elements.

In certain aspects, the transmitters 120-1 to 120-N are configured to transmit signals via the respective antennas 122-1 to 122-N using one or more radio access technologies, including, but not limited to, third generation (3G) technology (e.g., CDMA), fourth generation (4G) technology (also known as Long Term Evolution (LTE)), fifth generation (5G) technology such as 5G NR, one or more technologies based on one or more IEEE 802.11 protocols (e.g., IEEE 802.11ac, IEEE 802.11n, IEEE 802.11ad, IEEE 802.11ax, IEEE 802.11ay, an IEEE 802.15 protocol, an IEEE 802.16 protocol, etc.), and/or one or more other technologies. In some aspects, the wireless device 100 transmits data to another wireless device (not shown) in a multiple-input-multiple-output (MIMO) transmission mode to increase throughput between the wireless device 100 and the other wireless device. In the MIMO transmission mode, the transmitters 120-1 to 120-N transmit multiple signals via the antennas 122-1 to 122-N, where each of the transmitters 120-1 to 120-N transmits a respective one of the multiple signals via the respective antenna 122-1 to 122-N. The transmitters 120-1 to 120-N may transmit the multiple signals at the same frequency. The MIMO transmission mode may employ spatial multiplexing, diversity coding, precoding, beam forming, multi-user MIMO, etc. In some aspects, the transmitters 120-1 to 120-N may be configured to transmit signals via the antennas 122-1 to 122-N using beamforming to direct transmissions toward the other wireless device (e.g., in the MIMO transmission mode). In these aspects, the transmissions may be electrically steered by adjusting the relative phases and/or amplitudes of the transmit signals for the different antennas 122-1 to 122-N.

The processor 110 interfaces with the transmitters 120-1 to 120-N via the bus 140. In certain aspects, the bus 140 includes multiple signal lines 142-1 to 142-N between the processor 110 and the transmitters 120-1 to 120-N, in which each of the signal lines 142-1 to 142-N is coupled between the processor 110 and the input of a respective one of the transmitters 120-1 to 120-N. To transmit data, the processor 110 may process the data into one or more signals (e.g., baseband signals or intermediate-frequency (IF) signals). The processing performed by the processor 110 may include coding the data and modulating the coded data (e.g., using any one of a variety of different modulation schemes, including BPSK, QPSK, QAM, etc.). For the example of MIMO, the processor 110 may also perform MIMO precoding, spatial processing, etc. The processor 110 outputs the one or more signals to the transmitters 120-1 to 120-N via the bus 140. In one example, the one or more signals comprise multiple signals, in which the processor 110 outputs each of the multiple signals to a respective one of the transmitters 120-1 to 120-N via the respective signal line 142-1 to 142-N. In this example, each of the multiple signals may include a respective one of multiple data streams. In another example, the processor 110 may output the same signal to the transmitters 120-1 to 120-N or a subset of the transmitters 120-1 to 120-N.

Each of the transmitters 120-1 to 120-N is configured to process the respective signal from the processor 110 into a respective RF signal for transmission via the respective antenna 122-1 to 122-N. The processing performed by each of the transmitters 120-1 to 120-N may include frequency up-conversion, power amplification, etc. For the example of MIMO, the RF signals output by the transmitters 120-1 to 120-N may have the same transmitting frequency.

In certain aspects, the processor 110 may set the transmission power level for each of the antennas 122-1 to 122-N by setting the gain of an amplifier in the respective transmitter 120-1 to 120-N accordingly. The processor 110 may set the gain of each of the amplifiers using the respective gain control signal. In this example, the processor 110 may independently set the transmission power levels for the antennas 122-1 to 122-N by setting the gains of the respective amplifiers using the respective gain control signals.

In another example, the processor 110 outputs multiple signals to the transmitters 120-1 to 120-N where each of the multiple signals corresponds to a respective one of the antennas 122-1 to 122-N. In this example, the processor 110 sets the transmission power level for each of the antennas by setting the amplitude of the respective signal accordingly. It is to be appreciated that the present disclosure is not limited to the above examples, and that the processor 110 may employ other techniques to set the transmission power levels of the antennas 122-1 to 122-N.

In certain aspects, the processor 110 may set the transmission power levels for the antennas 122-1 to 122-N using an open power control loop and/or a closed power control loop. For the example of an open power control loop, the wireless device 100 may receive a pilot signal from another wireless device (not shown) via a receiver (not shown). In this example, the processor 110 estimates channel conditions between the wireless device 100 and the other wireless device based on the received pilot signal, and sets the transmission power levels for the antennas 122-1 to 122-N based on the estimated channel conditions. For the example of a closed power control loop, the wireless device 100 receives a feedback signal from the other wireless device via a receiver (not shown), in which the feedback signal indicates channel conditions between the wireless device 100 and the other wireless device. In this example, the processor 110 sets the transmission power levels for the antennas 122-1 to 122-N based on the indicated channel conditions.

Further, the processor 110 may set the transmission power levels for the antennas 122-1 to 122-N to keep RF exposure from the wireless device 100 within an RF exposure limit set by a regulator (e.g., the FCC), as will be discussed further below. In this case, the transmission power levels for the antennas 122-1 to 122-N are constrained by the RF exposure limit.

In certain wireless devices such as 5G NR devices, it is possible that a device (e.g., device 100) could simultaneously transmit at frequencies less than 6 GHz (i.e., sub 6 GHz), which may require an RF exposure evaluation in terms of Specific Absorption Rate (i.e., SAR in units of W/kg), as well as at frequencies greater than 6 GHz (i.e., mmWave), which evaluate exposure in terms of power density (i.e., "PD" in units of mW/cm$^2$). Due to the regulations on simultaneous exposure, this limits the maximum transmit (Tx) power of a wireless device for both the less than 6 GHz frequency band and the greater than 6 GHz frequency band. In order to maximize Tx power, it is known to utilize real time RF exposure algorithms that determine time-averaged SAR and time-averaged PD exposures over given time windows in real time to determine future sub 6 GHz and mmWave antenna power limits in real-time using pre-stored SAR and PD values and/or distributions.

To assess RF exposure from transmissions of the wireless device 100, the wireless device 100 may include multiple SAR distributions (also referred to as SAR maps) stored in the memory 115. Each of the SAR distributions may correspond to a respective one of multiple transmits scenarios supported by the wireless device 100. The transmit scenarios may correspond to various combinations of antennas 122-1 to 122-N, frequency bands, channels and/or body positions, as discussed further below.

The SAR distribution for each transmit scenario may be generated based on measurements (e.g., E-field measurements) performed in a test laboratory using a model of a human body. After the SAR distributions are generated, the SAR distributions are stored in the memory 115 to enable the processor 110 to assess RF exposure in real time, as discussed further below. Each SAR distribution includes a set of SAR values, where each SAR value may correspond to a different location (e.g., on the model of the human body). Each SAR value may comprise a SAR value averaged over a mass of 1 g or 10 g at the respective location.

As discussed before, the wireless device 100 may support multiple transmit scenarios. In certain aspects, the transmit scenarios may be specified by a set of parameters. The set of parameters may include one or more of the following: an antenna parameter indicating one or more antennas used for transmission (i.e., active antennas), a frequency band parameter indicating one or more frequency bands used for transmission (i.e., active frequency bands), a channel parameter indicating one or more channels used for transmission (i.e., active channels), a body position parameter indicating the location of the wireless device 100 relative to the user's body location (head, trunk, away from the body, etc.), distance of human tissue from the device, and/or other parameters. In cases where the wireless device 100 supports a large number of transmit scenarios, it may be very time-consuming and expensive to perform measurements for each transmit scenario in a test setting (e.g., test laboratory). To reduce test time, measurements may be performed for a subset of the transmit scenarios to generate SAR distributions for the subset of transmit scenarios. In this example, the SAR distribution for each of the remaining transmit scenarios may be generated by combining two or more of the SAR distributions for the subset of transmit scenarios. For example, SAR measurements may be performed for each one of the antennas 122-1 to 122-N to generate a SAR distribution for each one of the antennas 122-1 to 122-N. In this example, a SAR distribution for a transmit scenario in which two or more of the antennas 122-1 to 122-N are active may be generated by combining the SAR distributions for the two or more active antennas.

In another example, SAR measurements may be performed for each one of multiple frequency bands to generate a SAR distribution for each one of the multiple frequency bands. In this example, a SAR distribution for a transmit scenario in which two or more frequency bands are active may be generated by combining the SAR distributions for the two or more active frequency bands.

It is to be appreciated that assessing RF exposure is not limited to the example of SAR distributions. For example, RF exposure may also be assessed using a single SAR value instead of a SAR distribution that includes multiple SAR values in some implementations. In this example, a SAR value may be measured for each of one or more of the exemplary scenarios discussed above, and stored in the memory 115 to enable the wireless device 100 to assess RF exposure for various scenarios, as discussed further below. It is also be appreciated that the wireless device 100 may also assess RF exposure based on power density (PD) and/or a combination of SAR and PD. Therefore, it is to be understand that the present disclosure is not limited to a particular type of RF exposure measurement, and that aspects of the present disclosure are generally applicable to other types of RF exposure measurements.

Furthermore, wireless devices may need to be compliant for a total time-averaged RF exposure from the transmitters of all radio access technologies in a device (e.g., WWAN, 5G NR, WLAN, and BT transmitters). If any of these technologies is not part of time-averaging, such as WLAN (e.g., a WLAN third party chip), for example, then a traditional method to achieve compliance is to statically split or divide the overall RF exposure margin into the non-time averaged technology (e.g., WLAN) and all other radio access technologies, which means that none of these technologies (e.g., 5G NR) can exceed this partial limit, thereby providing less power for transmission at all times irrespective of the current level of the WLAN exposure, for example.

Further concerning traditional approaches for RF exposure compliance, the time-averaged RF exposure for some technologies, such as WWAN, and the RF exposure from the remaining technologies, such as WLAN, should be less than or equal to the limit in total. For this particular example, this approach may be expressed by the following relationship: The time-averaged RF exposure of WWAN (+5G NR)+RF exposure from WLAN≤100%. Compliance may then be accomplished by splitting the margin into "A" and "B" portions. In particular, this can be determined based on the following conditions:

Time-averaged RF exposure of WWAN (e.g., "5G NR")≤$A$

RF exposure from WLAN≤$B$ $A+B≤100\%$

This approach has the disadvantage of lowering the margin to set values "A" or "B", which is less than total margin (i.e., 100%) irrespective of whether the particular radio technology is on or off.

Another alternative for attempting compliance with RF exposure limits is to prevent simultaneous transmission of time-averaged technologies (e.g., WWAN) and non-time-averaged technologies (e.g., WLAN). By limiting simultaneous transmissions, theoretically a 100% margin can be provided for each individual radio technology (e.g., WWAN and WLAN), but this does not guarantee time-averaged compliance as will be explained below with regard to FIGS. 2A-2C.

Figure 2A:
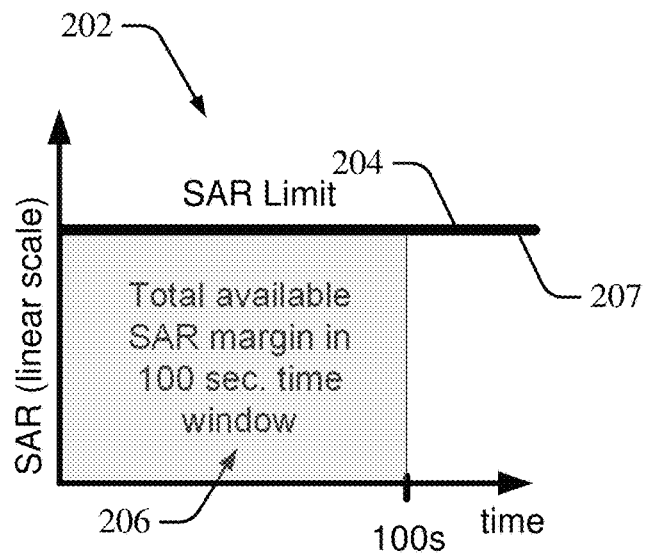
FIG. 2A shows a graph of SAR exposure of a radio access technology over time.

FIG. 2A shows a graph illustrating SAR levels over time for different technologies when utilizing the approach of preventing simultaneous transmissions of time-averaged technologies (e.g., WWAN) and non-time-averaged technologies (e.g., WLAN). The theoretical total RF exposure compliance without regard to particular radio technologies is shown at 202 where the SAR limit 204 is emitted for one time window (e.g., 100 seconds) specified by a regulator for averaging RF exposure. Hence, the total available SAR margin is illustrated by time window 206.

Figure 2B:
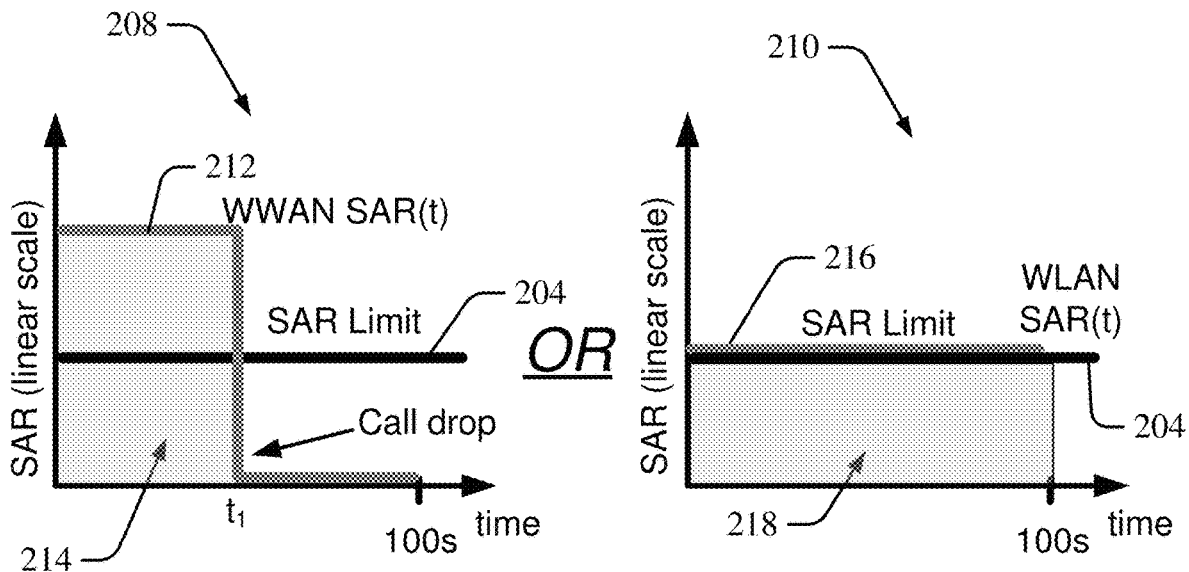
FIG. 2B shows a graph of SAR exposure of one or the other of two radio access technologies over a particular time in a system precluding simultaneous transmissions from the two radio access technologies to control RF exposure.

FIG. 2B illustrates a graph showing two different scenarios 208 and 210 where transmissions are compliant with exposure limits using a method limiting simultaneous transmissions that provides the equivalent exposure as the total limit shown in FIG. 2A. In scenario 208, a time-averaged technology such as a WWAN technology transmits at a level 212 above the SAR limit 204, but for a time less than the time window (e.g., 100 seconds) shown in the example of FIG. 2A. In this example, the call is dropped at a time $t_1$ such that the total SAR exposure time window 214 is equivalent to the SAR exposure in FIG. 2A through time-averaging of the WWAN technology. It is noted that because the radio technology is time-averaged such that the transmission time is lessened in the scenario 208, the SAR level 212 may exceed the SAR limit 204 as long as the total SAR exposure (i.e., window 214) when averaged over the time window (e.g., 100 seconds) is within the total limit (e.g., window 206 in FIG. 2A).

In the other RF exposure compliant scenario 210, a non-time averaged technology such as a WLAN is assumed to transmit at a level 216 over a 100 second time period at the SAR limit 204. As no other technology simultaneously transmits during this time, the time window 218 is equivalent to the window 206 shown in FIG. 2A. In the present disclosure, the SAR limit (or 100% of RF exposure margin) may be equal to a regulatory SAR limit set by a regulatory body (e.g., Federal Communications Commission). In certain aspects, the SAR limit may be set to a lower value below the regulatory SAR limit to account for device uncertainties and/or to budget enough SAR margin to comply with total RF exposure in simultaneous technologies with other transmitters (for example Bluetooth, to comply with total RF exposure compliance in WWAN+Bluetooth and WLAN+Bluetooth scenarios). Thus, in the present disclosure, a SAR limit may be equal to or lower than a regulatory SAR limit.

Figure 2C:
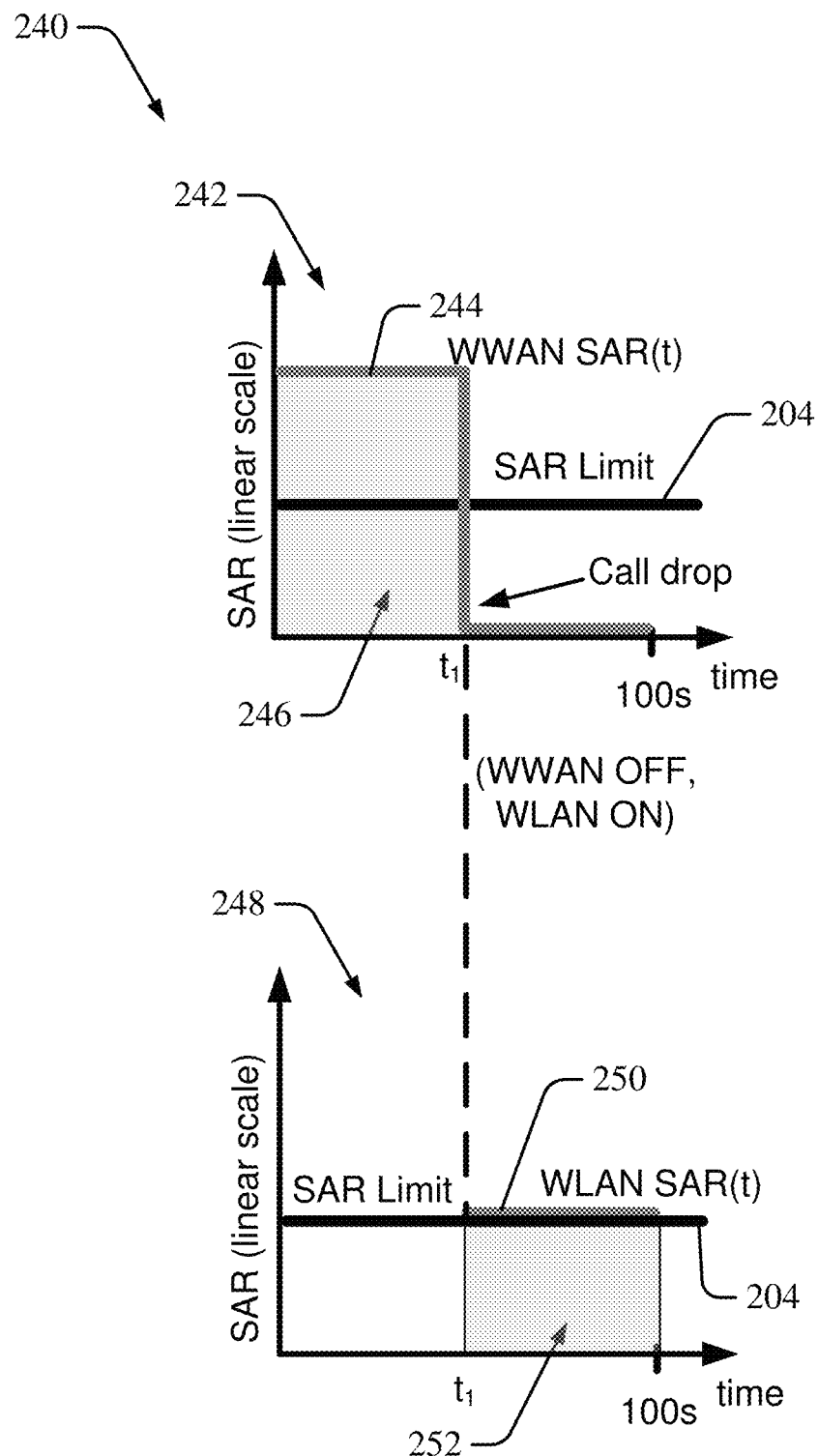
FIG. 2C shows a graph of SAR exposure of the combination of at least two radio access technologies over a particular time in a system precluding simultaneous transmissions from two radio access technologies to control RF exposure.

FIG. 2C illustrates a scenario 240 where two technologies (i.e., a time averaged technology and a non-time averaged technology) transmit at different times to attempt compliance with RF exposure limits. In scenario 240, however, while the time-averaged RF exposure for a first time-averaged technology such as WWAN is less than or equal to 100% and the RF exposure for a second, non-time-averaged technology such as WLAN is also less than or equal to 100%, the RF exposure of the system will not be compliant with RF exposure limits. As may be seen at 242, a time-averaged technology such as a WWAN technology transmits at a level 244 above the SAR limit 204, but for a time less than the 100 seconds shown in the example of FIG. 2A. In this example, a WWAN call is dropped at a time $t_1$ such that the total SAR exposure time window 246 is less than 100% of the total RF exposure limit through time-averaging of the WWAN technology.

After the transmission termination using the first technology (i.e., WWAN) at time $t_1$, transmissions using the non-time-averaged technology (e.g., WLAN) are started. In the example shown at 248, the WLAN transmission 250 at the SAR limit 204 from $t_1$ to 100 seconds yields an RF exposure time window 252. Both the time-averaged WWAN exposure shown at 242 and the WLAN exposure shown at 248 are each less than the 100% RF exposure limit illustrated in FIG. 2A. The RF exposure sum total (WLAN+WWAN), however, is greater than 100% over the 100 second time period, and thus the system as a whole is non-compliant with the RF exposure limits.

In light of the above approaches, further methods and apparatus are disclosed herein to provide dynamic adjustment of the Tx power limits for transmissions of the non-time averaged technology (or technologies) to optimize the RF exposure margin and gain a larger RF exposure margin for the active transmissions of the time averaged technologies (e.g., WWAN, 5G NR, etc.) in order to improve overall device performance.

According to some aspects, in systems where the simultaneous transmission of time-averaged RF exposure technologies (e.g., WWAN) and non-time-averaged RF exposure technologies (e.g., WLAN) is not allowed, a time-delay may be added prior to switching between the time-averaged and non-time-averaged technologies. For example, if the WWAN technology is turned off, the WLAN technology will not be turned on immediately, but would be controlled to wait to turn on after a predetermined time delay expires. According to further aspects, the predetermined time delay may be calculated based on the amount or level of past exposure from the time-averaged technology (e.g., WWAN). For the example illustrated in FIG. 2C, this would be equal to delaying transmission of the non-time-averaged RF exposure technology (e.g., WLAN) between time $t_1$ and 100 second (i.e., predetermined time delay equal to 100 s–$t_1$). The time delay can be computed based on the transmitted RF exposure margin by previous time-averaged RF exposure technology (e.g., WWAN) transmission. As used herein, a time-averaged RF exposure technology is a radio technology that uses time-averaging over a time window for ensuring that RF exposure from the radio technology complies with a predefined RF exposure limit.

Figure 3:
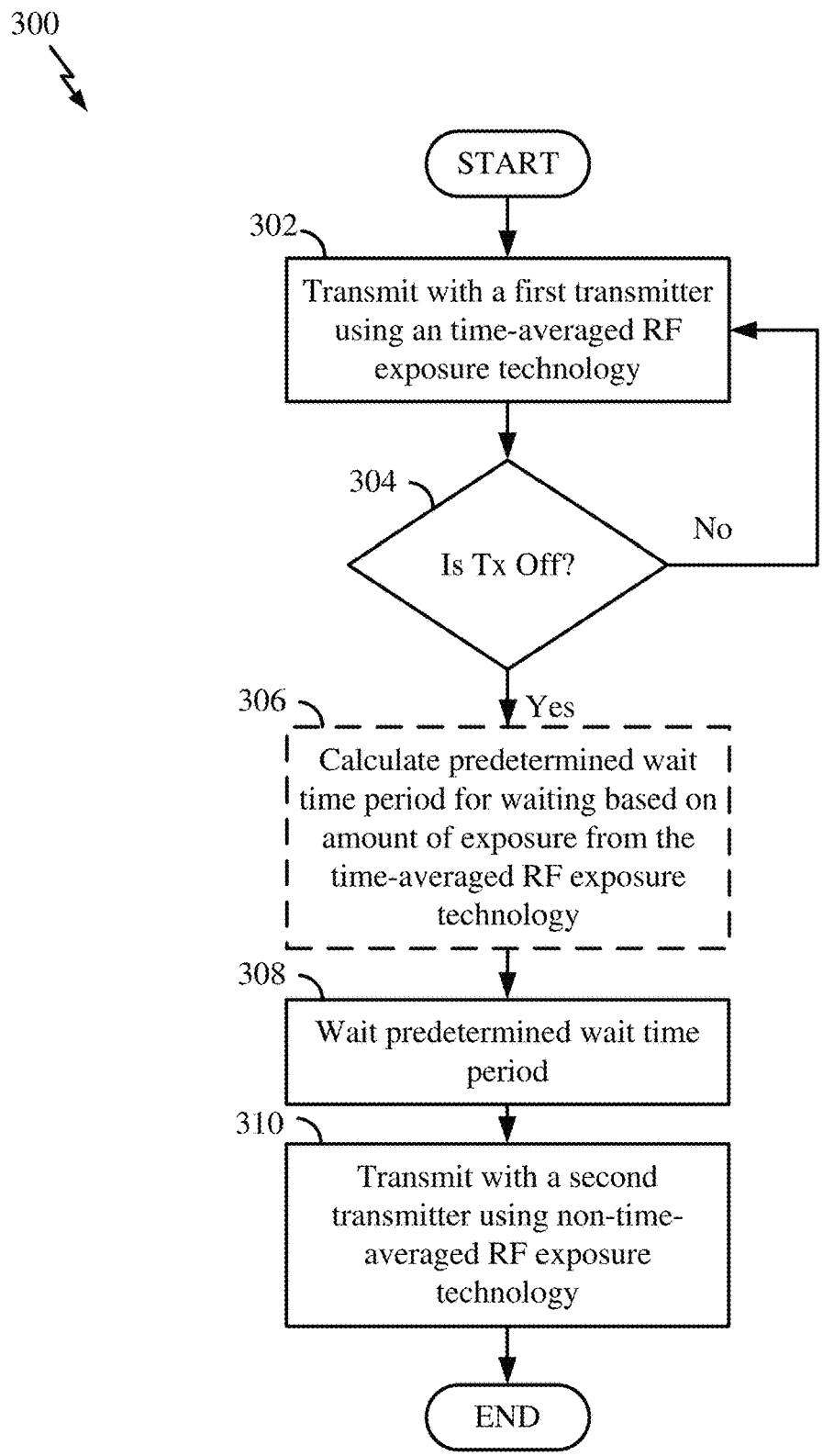
FIG. 3 illustrates a flow diagram showing a method for controlling the transmissions for time-averaged and non-time averaged RF exposure technologies according to certain aspects of the present disclosure.

FIG. 3 illustrates a flow diagram showing a method 300 for controlling the transmissions for time-averaged and non-time averaged RF exposure technologies in a wireless device (e.g., device 100) according to an aspect. In method 300, a first transmitter (e.g., 120-1) transmits using a time-averaged RF exposure technology (e.g., WWAN) as shown at block 302. While the time-averaged RF exposure technology (or technologies) is transmitting, a check to determine whether the first transmitter and attendant technology are turned off is performed as indicated by decision block 304. If the first transmitter is not turned off (i.e., the first transmitter is still transmitting using the time-averaged RF exposure technology (e.g., WWAN)), then the method 300 may loop back to block 302 until the first transmitter is turned off.

If the first transmitter is turned off at decision block 304 (i.e., the first transmitter stops transmitting using the time-averaged RF exposure technology (e.g., WWAN)), then flow may then proceed to optional block 306 where a predetermined time period for waiting is calculated based on amount of exposure from the time-averaged RF technology that was previously transmitting at block 302. In other aspects, a set predetermined time period may be utilized instead of calculating the value at block 306.

Regardless of whether the predetermined time period is calculated in block 306 or a set predetermined time period is utilized, flow proceeds to block 308 where the wireless device waits or delays the transmission of a next technology such as a non-time-averaged RF exposure technology for the duration of the predetermined time period, thereby more likely ensuring that the RF exposure limit will not be exceeded, such as in the scenario illustrated by FIG. 2C. After the passage of the predetermined time period in block 308, flow proceeds to block 310 where a second transmitter (e.g., 120-2) transmits using a non-time-averaged RF exposure technology (e.g., WLAN).

As discussed above, in optional block 306, the predetermined time period for waiting may be calculated. In one example, if the transmitter using the time-averaged RF technology (e.g., WWAN) transmits at the high power level 244 illustrated in FIG. 2C at block 302, then, for RF exposure compliance, the wireless device may calculate a predetermined time of one time window minus t1 (e.g., 100 s–t1) where t1 is the amount of time that the transmitter using the time-averaged RF technology transmits at the level 244. In another example, the transmitter using the time-average technology (e.g., WWAN) transmits at or below the power level 207 (power level corresponding to the SAR limit 204 illustrated in FIG. 2C) at block 302. In this example, the transmitter using the non-time-averaged RF technology (e.g., WLAN) need not wait after time t1 before transmitting since the transmitter using the non-time-averaged RF technology can transmit at the power level 207 or below and still be compliant.

Figure 2D:
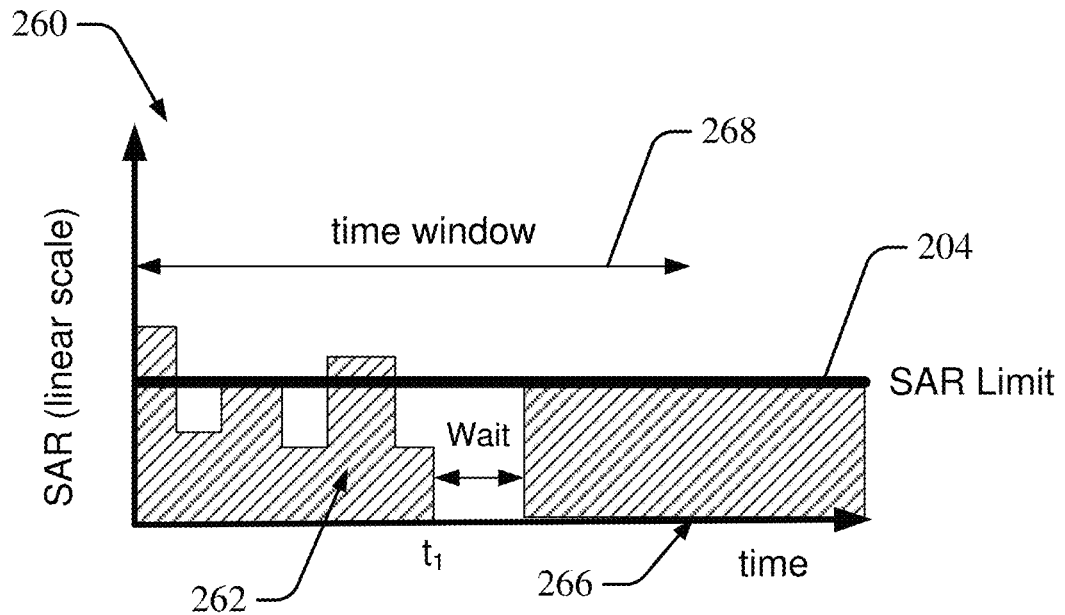
FIG. 2D shows an example of determining a wait time between completion of a transmission using a RF exposure time-averaged technology and a transmission using an RF exposure non-time-averaged technology according to certain aspects.
Figure 2D:
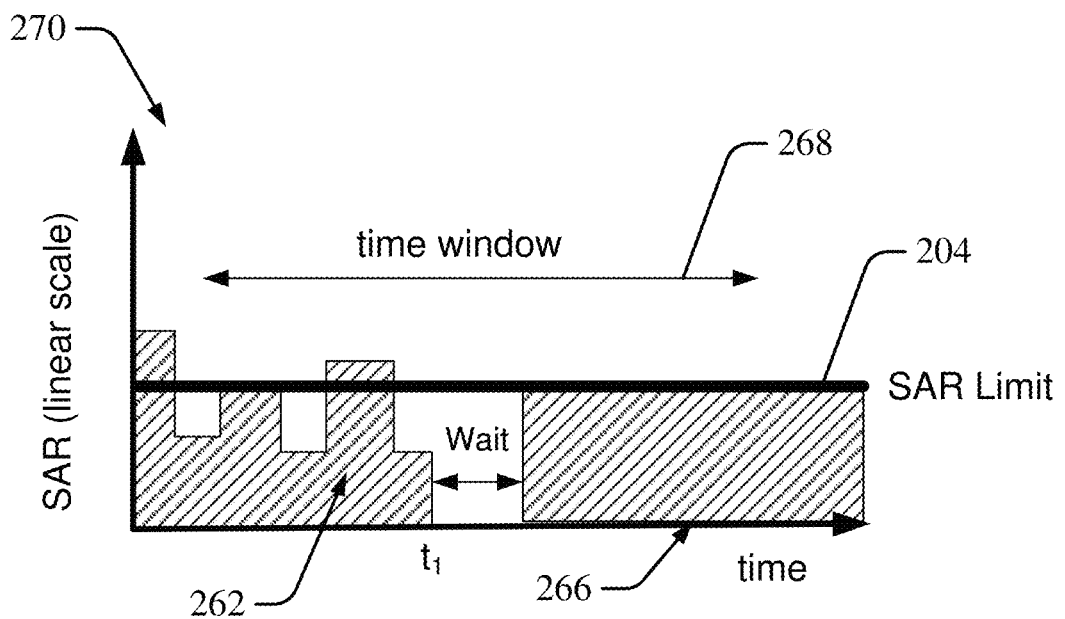

FIG. 2D illustrates another example for determining the wait period (i.e., time period for waiting) according to certain aspects. FIG. 2D shows a first graph of RF exposure 260 including an RF exposure profile 262 for a time-averaged technology (e.g., WWAN) and an RF exposure profile 266 for a non-time averaged technology (e.g., WWAN). In this example, the transmission for the time-averaged technology ends at time t1. In this example, the processor 110 may determine the wait time at approximately time t1 in which the processor 110 may determine the RF exposure profile 266 for the time-averaged technology based on previous transmit power levels for the time-averaged technology that are known by the processor 110. For example, the previous transmit power levels may be stored in the memory and accessed by the processor 110. Also, in this example, the processor 110 may assume that the non-time-average technology transmits at the power level corresponding to the RF exposure limit (e.g., SAR limit 204).

In this example, the processor 110 may select a wait time (e.g., wait time less than time window–t1) and compute an RF exposure profile over the time window (e.g., set by regulator). The processor 110 may then compare the RF exposure profile over the time window with the total RF exposure margin (e.g., 206), and determine whether to use the wait time in block 308 based on the comparison (e.g., use the wait time if the RF exposure profile is equal to or less than the total RF exposure margin (e.g., 206)). In this example, a portion of the RF exposure profile includes an RF exposure profile from the time-averaged technology and an RF exposure profile from the non-time-averaged technology with the wait time therebetween. In certain aspects, the processor 110 may shift the time window 268 to multiple time positions. In this regard, FIG. 2D shows an example 270 of one of the shifts in which the time window 268 is shifted to the right. In this example, the processor 110 may compute the RF exposure profile over the time window 268 for each of the shifts, compare each of the RF exposure profiles with the total RF exposure margin (e.g., 206), and determine whether to use the wait time in block 308 based on the comparisons (e.g., use the wait time if each of the RF exposure profiles is equal to or less than the total RF exposure profile). If one or more of the computed RF exposure profiles exceeds the total RF exposure margin, then the processor 110 may select another wait time (e.g., a longer wait time) and repeat the above process using the other wait time.

In yet further aspects, if the non-time-averaged technology (e.g., WLAN) is transmitting and then is turned off, the time-averaged technology (e.g., WWAN) could be turned on immediately. However, in this case, the time-averaged technology may be operated such that the peak Tx power is limited to the maximum time-averaged Tx power level 207 (i.e., Tx power level corresponding to SAR limit). In certain aspects, the peak Tx power of the time-averaged technology (e.g., WWAN) may be limited (e.g., to power level corresponding to the SAR limit) for a predetermined time period to ensure RF exposure compliance of the time-averaged technology. In one example, the time period may be equal to one time window (e.g., 100 s). As an example, in FIG. 2C, if the non-time averaged RF exposure technology (e.g., WLAN) transmits first at the SAR limit between 0 s and time $t_1$ and turns off at time t1, and the time-averaged RF exposure technology (e.g., WWAN) turns on at time $t_1$, then, to remain compliant with total RF exposure, the time-averaged technology can be limited to a peak Tx power level of 207 (i.e., maximum time-averaged Tx transmit level 207 corresponding to SAR limit 204) for one time window between time $t_1$ and $t_1$+one time window (e.g., $t_1$+100 s). In this example, the time window may correspond to a time-averaging window (e.g., 100 s in the example in FIG. 2C) as defined by a regulator. In another example, the predetermined time period may be less than one window if the time-averaged technology (e.g., WWAN) transmits at low power (i.e., below power level 207) during this time (i.e., after time t1 and until the predetermined time period expires). For example, the processor 110 may determine an RF exposure profile for the non-time-averaged technology based on previous transmit power levels for the non-time-averaged technology that are known by the processor 110. For example, the previous transmit power levels may be stored in the memory 115 and accessed by the processor 110. In this example, the processor 110 may determine the time period based on the RF exposure profile for the non-time-averaged technology (e.g., determine a shorter time period for a lower RF exposure profile and longer time period for high RF exposure profile).

In another example, the processor 110 may input the RF exposure profile for the non-time-averaged technology into an algorithm that assesses RF exposure compliance over the time window for the time-averaged technology and sets the transmit power level for the time-averaged technology based on the assessment. This allows the algorithm (which may be performed by processor 110) to account for the RF exposure profile for the non-time-averaged technology in assessing RF exposure compliance over the time window. The RF exposure profile for the non-time averaged technology may be input to an existing algorithm that assesses RF exposure compliance over the time window for the time-averaged technology, in which the algorithm processes the RF exposure profile for the non-time averaged technology the same as an RF exposure profile for the time-averaged technology (e.g., the algorithm does not make a distinction between RF exposure from the non-time-averaged technology and the time-averaged technology in assessing RF exposure compliance over the time window). In some examples, the RF exposure profile for the non-time-averaged technology that is input to the existing algorithm that assesses RF exposure compliance over the time window for the time-averaged technology assumes that the non-time-averaged technology transmitted at a maximum power for the entirety of the time it was on.

Figure 4:
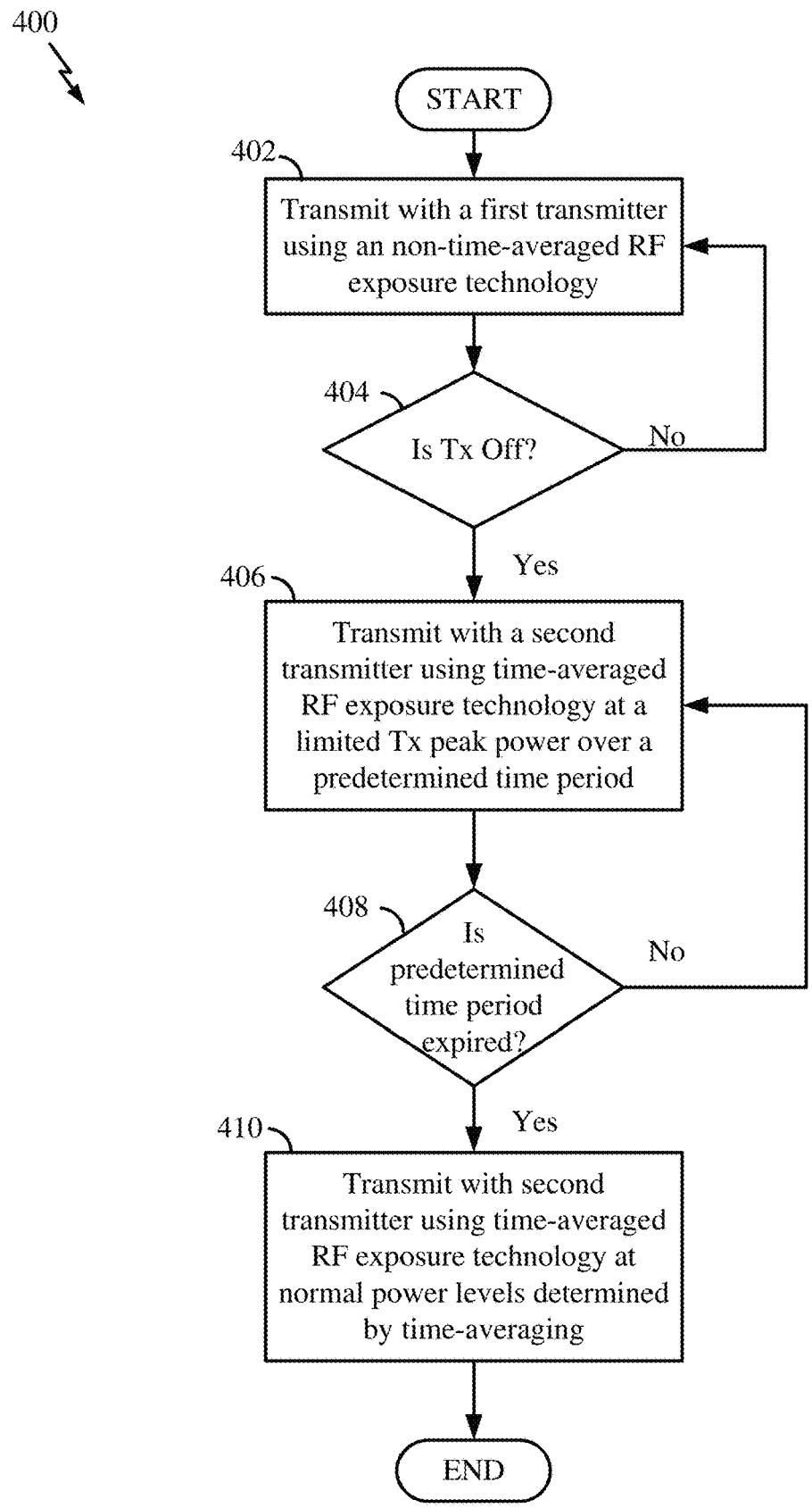
FIG. 4 illustrates a flow diagram of another method for controlling the transmissions for time-averaged and non-time averaged RF exposure technologies according to certain aspects of the present disclosure.

FIG. 4 illustrates a flow diagram showing a further method 400 for controlling the transmissions for time-averaged and non-time averaged RF exposure technologies in a wireless device (e.g., device 100) according to an aspect. In method 400, a first transmitter (e.g., 120-2) transmits a signal using a non-time-averaged RF exposure technology (e.g., WLAN) as shown at block 402. After the transmit of the first transmitter is turned off as determined at decision block 404, flow proceeds to block 406 where transmission with a second transmitter using time-averaged RF exposure technology (e.g., WWAN) is performed. Additionally, it is noted that the transmission shown at block 406 includes transmission at a limited transmit peak power over a predetermined time period (e.g., peak transmit power limited to the maximum time-averaged Tx power level 207). In some aspects, the predetermined time period may be one time window (e.g., 100 s) or less than one time window if the second transmitter transmits at low power (i.e., below power level 207, including zero power level representing delayed transmission using the time-averaged technology (e.g., WWAN)). After expiration or tolling of the predetermined time period as determined at decision block 408, flow proceeds to block 410, whereupon the second transmitter may be permitted to revert to normal time-averaging and power levels according to the particular time-averaging algorithm or methodology being employed in the wireless device and/or second transmitter.

Figure 5:
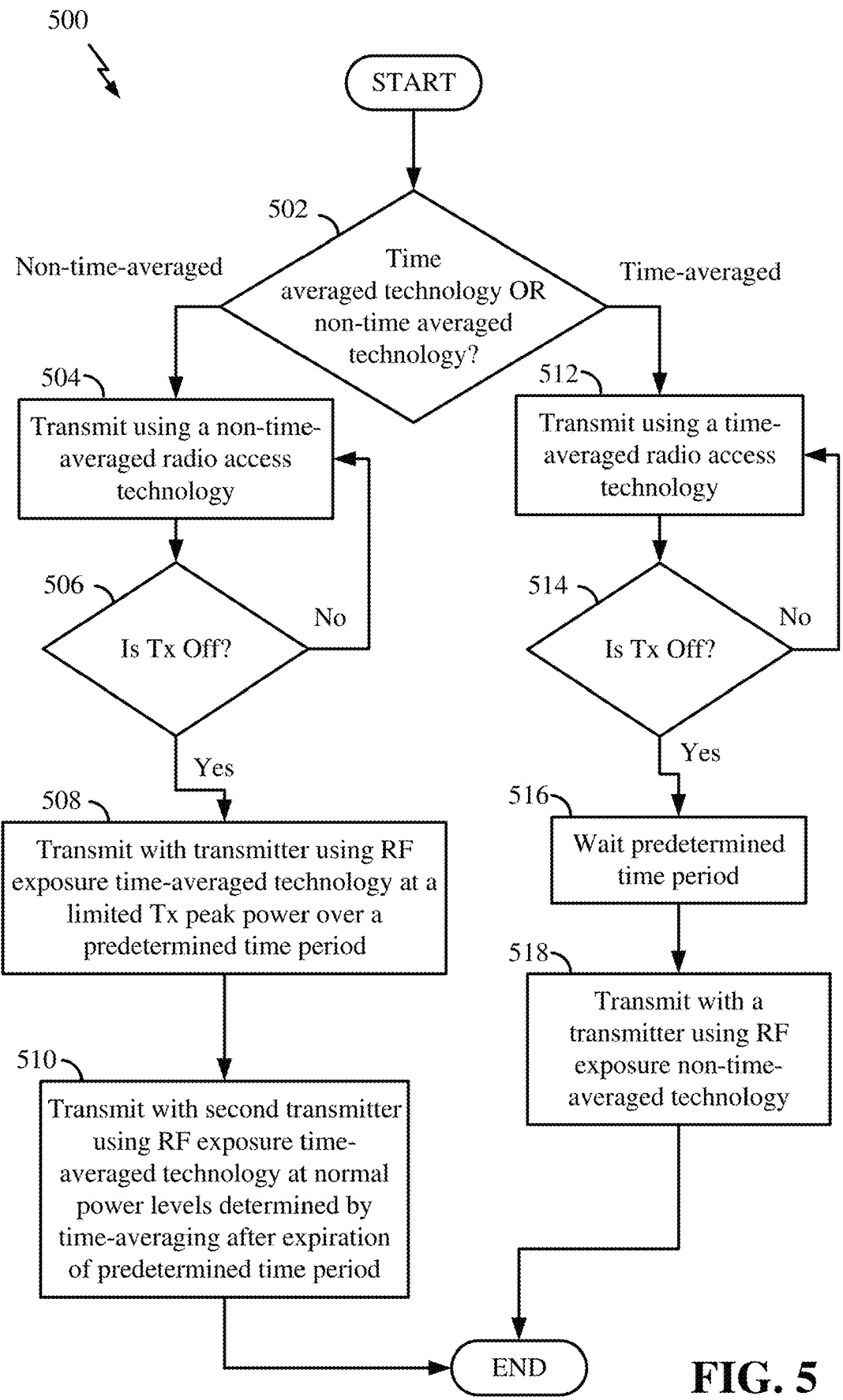
FIG. 5 illustrates a flow diagram of yet another method for controlling the transmissions for time-averaged and non-time averaged RF exposure technologies according to certain aspects of the present disclosure.

FIG. 5 illustrates a method 500 for controlling the transmissions for time-averaged and non-time averaged RF exposure technologies in a wireless device (e.g., device 100) according to a further aspect that incorporates features of both methods 300 and 400 in FIGS. 3 and 4. Method 500 is a methodology that may be used in a system where a non-time-averaged RF exposure technology (e.g., WLAN) and a time-averaged RF exposure technology (e.g., WWAN) are not transmitted simultaneously, just as in methods 300 and 400. Method 500 includes first determining whether a current transmission is to be from a transmitter (e.g., 120-1) using non-time-averaged RF exposure technology or a transmitter (e.g., 120-2) using time-averaged RF exposure technology as shown at decision block 502. If the current transmission is being performed with a non-time-averaged RF exposure technology (e.g., WLAN), flow proceeds to block 504 where a transmitter transmits a signal using a non-time-averaged RF exposure technology (e.g., WLAN). After the first transmitter is turned off as determined at decision block 506, flow proceeds to block 508 where transmission with a transmitter using time-averaged RF exposure technology (e.g., WWAN) is performed. Additionally, it is noted that the transmission shown at block 508 includes transmission at a limited transmit peak power over a predetermined time period (e.g., peak transmit power limited to the maximum time-averaged Tx power level 207). In some aspects, the predetermined time period may be one time window (e.g., 100 s) or less than one time window if the second transmitter transmits at low power (i.e., below power level 207, including zero power level representing delayed transmission using the time-averaged technology (e.g., WWAN)). After expiration of the predetermined time period of block 508, flow proceeds to block 510, whereupon the transmitter using the time-averaged RF exposure technology may be permitted to revert to normal time-averaging and transmit power levels according to the particular time-averaging algorithm or methodology being employed in the wireless device or transmitter.

In the alternative, if a time-averaged RF exposure technology (e.g., WWAN) is currently being used to transmit signals as determined at block 502, flow proceeds to transmitting using a transmitter (e.g., 120-2) operable according to at least a radio access technology (RAT) with time-averaging for RF exposure compliance as shown in block 512. While the time-averaged RF exposure technology (or technologies) is transmitting, a check to determine whether the transmitter and attendant technology are turned off is performed as indicated by decision block 514 and the loop back to block 512 until the technology is turned off is conducted.

Flow then proceeds to block 516 where the wireless device is configured to wait or delay the transmission of a next RF exposure technology such as a non-time-averaged RF exposure technology (e.g., WLAN) for the duration of the predetermined time period, thereby more likely ensuring that the RF exposure limit will not be exceeded. Of further note, the processes of block 512 may include calculating the predetermined time period for waiting based on amount of exposure from the time-averaged RF technology (e.g., WWAN) that was previously transmitting at block 512. In other aspects, a set predetermined time period may be utilized instead of calculating the value at block 512.

After the predetermined time period in block 516 expires, flow proceeds to block 518 where transmission with a transmitter (e.g., 120-1) operable according to a non-time-averaged RF exposure technology (e.g., WLAN) is then performed.

In still further aspects, it is noted in connection with methods 300, 400, or 500, if the time-averaging algorithm or methodology for the time-averaged technology (e.g., WWAN) is configured to receive input information concerning whether the non-time-averaged technology (e.g., WLAN) is turned on or off, then the time-averaging algorithm may be configured to account for the non-time-averaged technology (e.g., WLAN) RF exposure by assuming that the non-time-averaged technology transmits at maximum power all the time that the non-time-averaged technology transmitter is turned on. In this way, the time-averaging algorithm can provide the appropriate Tx power limits for the time-averaged technology (e.g., WWAN) depending on the history of the non-time-averaged transmitter activity, i.e., adjust the time delay prior to high power transmission for the time-averaged technology transmitter. In one example, the processes 406 and 508 may utilize this further methodology for determining the predetermined time delay.

According to yet further aspects, if a time-averaging algorithm is configured to be able to send back-off or reduced power limits to the non-time-averaged technology (e.g., WLAN) transmitter, for example, and has knowledge of whether non-time-averaged technology transmitter is on or off, the non-time-average technology RF exposure may be even more accurately accounted for. In an aspect, the non-time-averaged technology (e.g., WLAN) transmitter may be limited to an "x" dB back-off level at all times when the time-averaged technology (e.g., WWAN) transmitter is active (i.e., the maximum RF exposure from non-time-averaged technology (e.g., WLAN) will be "x" dB below the level 207). In a particular aspect, when normalizing the RF exposure level with the SAR limit (i.e., level 207), then the non-time-averaged technology normalized RF exposure may be set equal to $10^{-x/10}$. Furthermore, when the time-averaged technology (e.g., WWAN) transmitter is off and the non-time-averaged technology (e.g., WLAN) transmitter is active, then the non-time-averaged technology (e.g., WLAN) transmitter is assumed to transmit at maximum power (i.e., the "x" decibel (dB) back-off level is zero and, thus, the WLAN normalized RF exposure=1). The assumption that the transmitter for the non-time-averaged technology transmits at the maximum power (i.e., WLAN normalized RF exposure=1 or $=10^{-x/10}$ in simultaneous transmission scenario) represents the worst-case RF exposure, and thus, represents a conservative estimate as the transmitter for the non-time-averaged technology could have transmitted at lower power levels than this worst-case assumption during this time period.

Figure 6A:
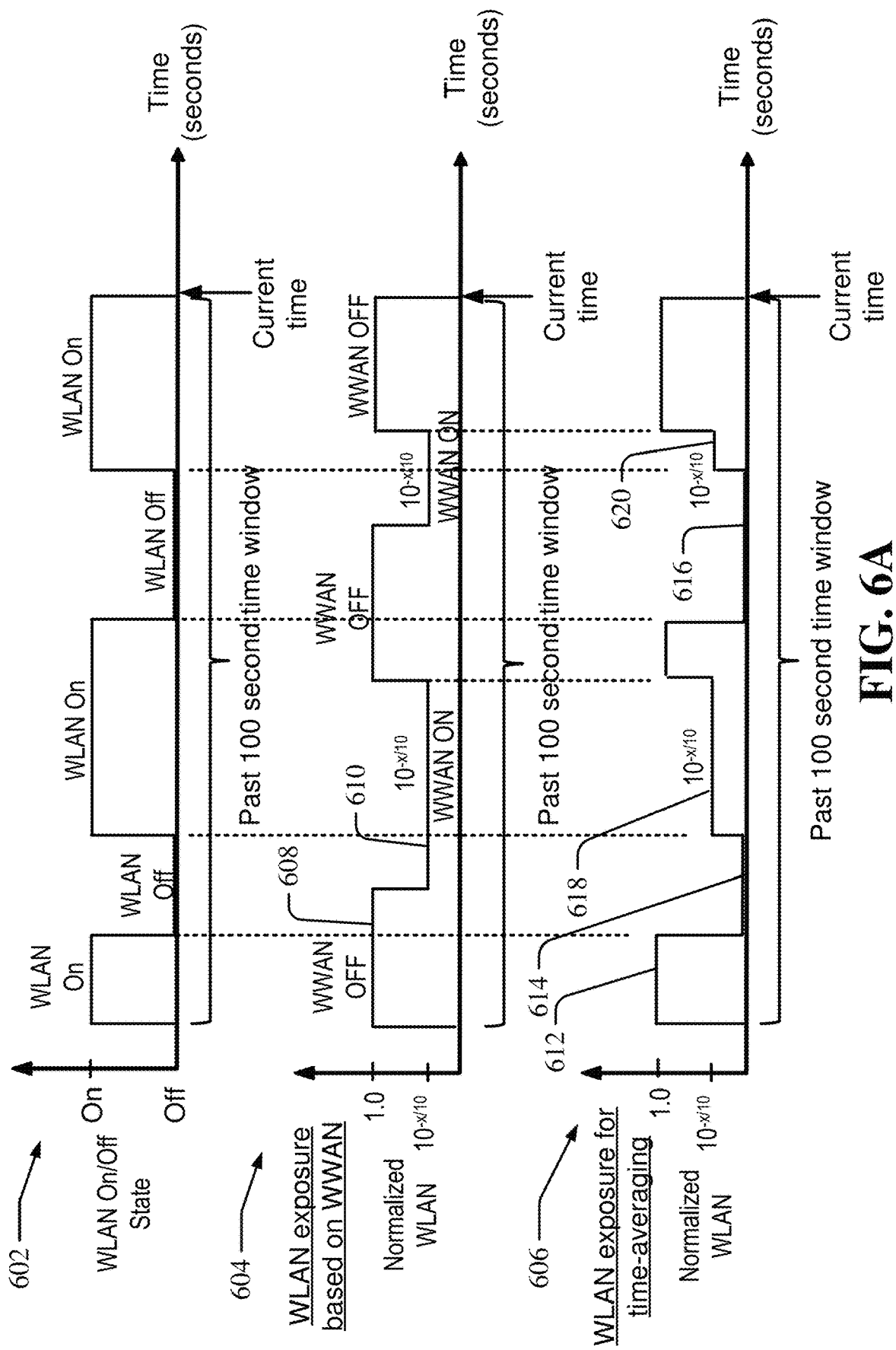
FIG. 6A shows a visual representation of an exemplary normalization of a WLAN exposure accounting for WWAN transmission according to certain aspects of the present disclosure.

As a visual example. FIG. 6A shows timelines 602, 604, and 606 illustrating different aspects of the WLAN (non-time-averaged in this example) signaling over a time window (e.g., 100 second window) occurring immediately prior to a current time. It is noted that although the example in FIG. 6A is discussed in connection with WLAN and WWAN, these technologies are merely exemplary and the concepts illustrated are more generally applicable to non-time-averaged RF exposure technologies and time-averaged RF exposure technologies. More particularly, in the example in FIG. 6A, the discussion in connection with WLAN applies generally to other non-time-averaged RF exposure technologies (e.g., Bluetooth technologies) and the discussion in connection with WWAN applies generally to other time-averaged RF exposure technologies. In yet other examples, WWAN is operated as a non-time-averaged technology and WLAN and/or Bluetooth is operated as a time-averaged technology. Therefore, the concepts illustrated in FIG. 6A are not limited to WLAN and WWAN, and may be applied to other non-time-averaged RF exposure technologies and time-averaged RF exposure technologies.

Additionally, it is to be understood that all the exposure levels depicted in FIGS. 2A, 2B, 2C. 6A, and 6B may correspond to continuous transmission (e.g., frequency division duplexing (FDD) schemes like WCDMA) or may correspond to burst transmissions (e.g., time division duplexing (TDD) schemes like GSM). It is also to be understood that a duty cycle for a transmission may be implemented. As used herein, the duty cycle of the transmission may refer to a portion (e.g., 5 ms) of a specific period (e.g., 500 ms) in which one or more signals are transmitted. In other words, the duty cycle of the transmission may represent a percentage or a fraction of the specific period during which one or more signals are transmitted. In certain cases, the duty cycle may be standardized (e.g., predetermined) with a specific radio access technology and/or may vary over time, for example, due to changes in radio conditions, mobility, and/or user behavior. Duty cycle can be applied on all the exposure levels discussed in this application. For example, if a transmission is occurring at a duty cycle of z % where z % is less than 100%, then the exposure level in FIGS. 2A, 2B, 2C, 6A, and 6B would be z %*exposure level at 100% duty cycle. In other words, that specific radio can transmit at a higher peak Tx power level corresponding to 1/z %*continuous Tx power level at 100% duty cycle.

In the example in FIG. 6A, timeline 602 illustrates a particular example of the on and off periods of a WLAN transmitter, which is either on or off (i.e., "On" or "Off" states as indicated in the "y" axis). Timeline 604 illustrates the WLAN transmission exposure based on states of an exemplary series of WWAN transmissions. In particular, the values in the "y" axis are the WLAN normalized exposure over time, which is in the "x" axis. The normalized exposure values are based on the dB relationship $10^{-x/10}$ and dependent on a WWAN on or off state. Thus, as may be seen in timeline 604, when the WWAN is off, the normalized value for the WLAN exposure is 1.0 as shown at 608 as one example, whereas when the WWAN is on, the normalized value for the WLAN exposure is reduced to a value of $10^{-x/10}$ for a predetermined x dB back off or attenuated value as shown at 610.

Timeline 606 is effectively a combination or composite of timelines 602 and 604 to derive a normalized WLAN transmission exposure profile that may be used as input information for a time-averaging method for a WWAN, as one example. As illustrated, when the WWAN is off and the WLAN is on or active, the normalized WLAN transmission exposure profile will have a value of "1" as may be seen at reference number 612. Similarly, when the WLAN is off and the WWAN is either on or off, the normalized WLAN transmission exposure profile will have a value of "0" as long as the WLAN is off as may be seen at reference numbers 614 and 616. During periods where both the WLAN and WWAN are on, the corresponding normalization of the WLAN signal is set equal to $10^{-x/10}$ for the predetermined x dB back off value as shown at reference numbers 618 and 620. In an aspect, an exposure profile generated in this manner may be generated by a processor (e.g., processor 110) or logic using knowledge of when the WLAN is on and off and knowledge of the x dB back off.

The WLAN transmission exposure profile may be used by the processor (e.g., processor) to determine the amount of the RF exposure margin (e.g., 206) used by the WLAN transmission over the time window. This allows the processor to take into account RF exposure from the WLAN transmission in the calculation of a transmit power level limit for a WWAN transmission. For example, the processor may combine the RF exposure profile for the WLAN over the time window with an RF exposure profile for the WWAN over the time window to obtain a combined RF exposure profile, and use the combined RF exposure profile to determine the total amount of the RF exposure margin (e.g., 206) used by both WLAN and WWAN and therefore determine a remaining RF exposure margin for RF exposure compliance. The processor may use the remaining RF exposure margin to determine a transmit power level limit for the WWAN transmission that provides RF exposure compliance. The processor may determine the RF exposure profile for WWAN by tracking the transmit power level for WWAN over the time window and using the tracked transmit power level to determine the RF exposure profile for WWAN.

By taking into account the back off of the WLAN transmission when both WLAN and WWAN are active (i.e., on), the RF exposure profile illustrated in FIG. 6A provides the processor with a more accurate representation of the RF exposure margin used by WLAN compared with blindly assuming the WLAN transmission is transmitted at 100% (e.g., power level corresponding to SAR limit), which over estimates the RF exposure margin used for WLAN. This allows the device to utilize more of the RF exposure margin for active transmissions of time-averaged technologies such as WWAN or 5G NR, as examples, thereby providing better overall device performance.

The back off value discussed above may be determined based on one or more factors. In one example, the back off value may be determined based on the spatial overlap between RF exposure from the WLAN transmission and RF exposure from the WWAN transmission. In this example, the RF exposure overlap may be larger, for example, when the WLAN transmitter and the WWAN transmitter transmit in the same general direction, and the RF exposure overlap may be smaller, for example, when the WLAN transmitter and the WWAN transmitter transmit in different directions (e.g., the antenna for WLAN and the antenna for WWAN are orientated in different directions on the wireless device). In this example, the back off value may be larger when the spatial overlap is greater. In another example, the back off value may be determined based on a priority of the WLAN transmission and the WWAN transmission. For example, the back off value may be larger when the WWAN transmission has higher priority than the WLAN transmission, and the back off value may be smaller when the WLAN transmission has higher priority than the WWAN transmission. For the case where the WLAN transmission has higher priority, the peak power level of the WWAN transmission may be limited to ensure RF exposure compliance. In certain aspects, simulations and/or tests may be performed to find a back off value that results in RF exposure compliance for simultaneous WLAN transmission and WWAN transmission under one or more scenarios.

Figure 6B:
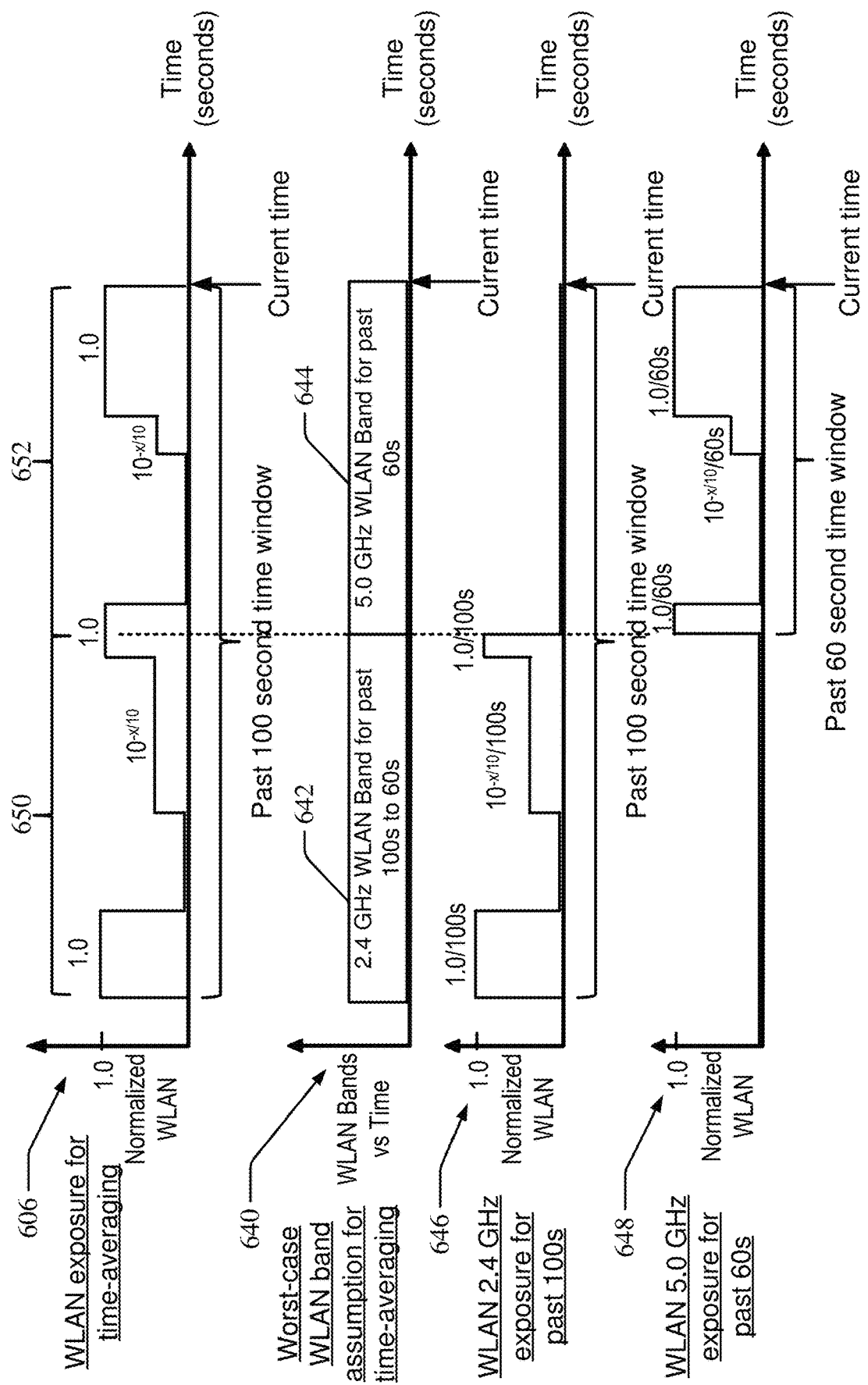
FIG. 6B shows a visual representation of an exemplary WLAN exposure accounting for WWAN transmission and different WLAN transmit frequencies according to certain aspects of the present disclosure.

In a further aspect, it is known that a WLAN transmitter (e.g., a non-time-averaged technology in this example) is able to transmit in both the 2.4 GHz and 5 GHz bands, for example, and the relevant regulator (e.g., the Federal Communications Commission (FCC), international commission, etc.) has mandated different respective time-averaging windows for different frequency bands (i.e., 100 seconds for 2.4 GHz and 60 seconds for 5 GHz). If the time-averaging algorithm has knowledge of WLAN transmitter activity whether in 2.4 GHz band or in 5 GHz band or in both bands (assume worst case in 60 seconds time window in that case), then each instant in time of the determined WLAN exposure profile in timeline 606 can be either accounted in 100 seconds time-window (for 2.4 GHz transmission only) or in 60 seconds time-window (for 5 GHz or 2.4 GHz+5 GHz transmissions). However, if the time-averaging algorithm has no knowledge of transmitting frequency of WLAN transmitter, then the WLAN exposure may be split into 2.4 GHz and 5 GHz time-windows according to certain aspects. As an example of splitting the WLAN exposure, FIG. 6B illustrates timelines of exemplary transmissions assuming the WLAN exposure profile shown by timeline 606 from FIG. 6A. In the example shown by FIG. 6B, over the past 100 second time window, a "worst case" scenario for transmissions that occurred in the past 100 seconds for the 2.4 GHz and 5.0 GHz bands is assumed as illustrated by timeline 640. In this timeline 640, transmission in the 2.4 GHz WLAN band is assumed for the past 100 seconds to 60 seconds as shown at 642. Likewise, transmission in the 5.0 GHz WLAN band as shown at 644 is assumed for the past 60 seconds before the current time. Although the example illustrates that the transmissions are split time-wise based on the FCC mandated time-averaging window times for different frequency bands, it is noted that the disclosure is not limited to this example and that other splits in time may be used.

Based on the assumed worst case during the band windows 642 and 644, the WLAN exposure shown in timeline 606 is split between the 2.4 and 5.0 GHz bands as shown in timelines 646 and 648, respectively. Time portion 650 of the WLAN exposure for time averaging in timeline 606 coinciding with window 642 (i.e., from the past 100 seconds to the past 60 seconds) is apportioned as the WLAN 2.4 GHz exposure for that time period and is shown in timeline 646. Similarly, time portion 652 of the WLAN exposure for time averaging in timeline 606 coinciding with window 644 (i.e., from the past 60 seconds to a current time) is apportioned as the WLAN 5.0 GHz exposure for that time period and is shown in timeline 648.

Figure 7:
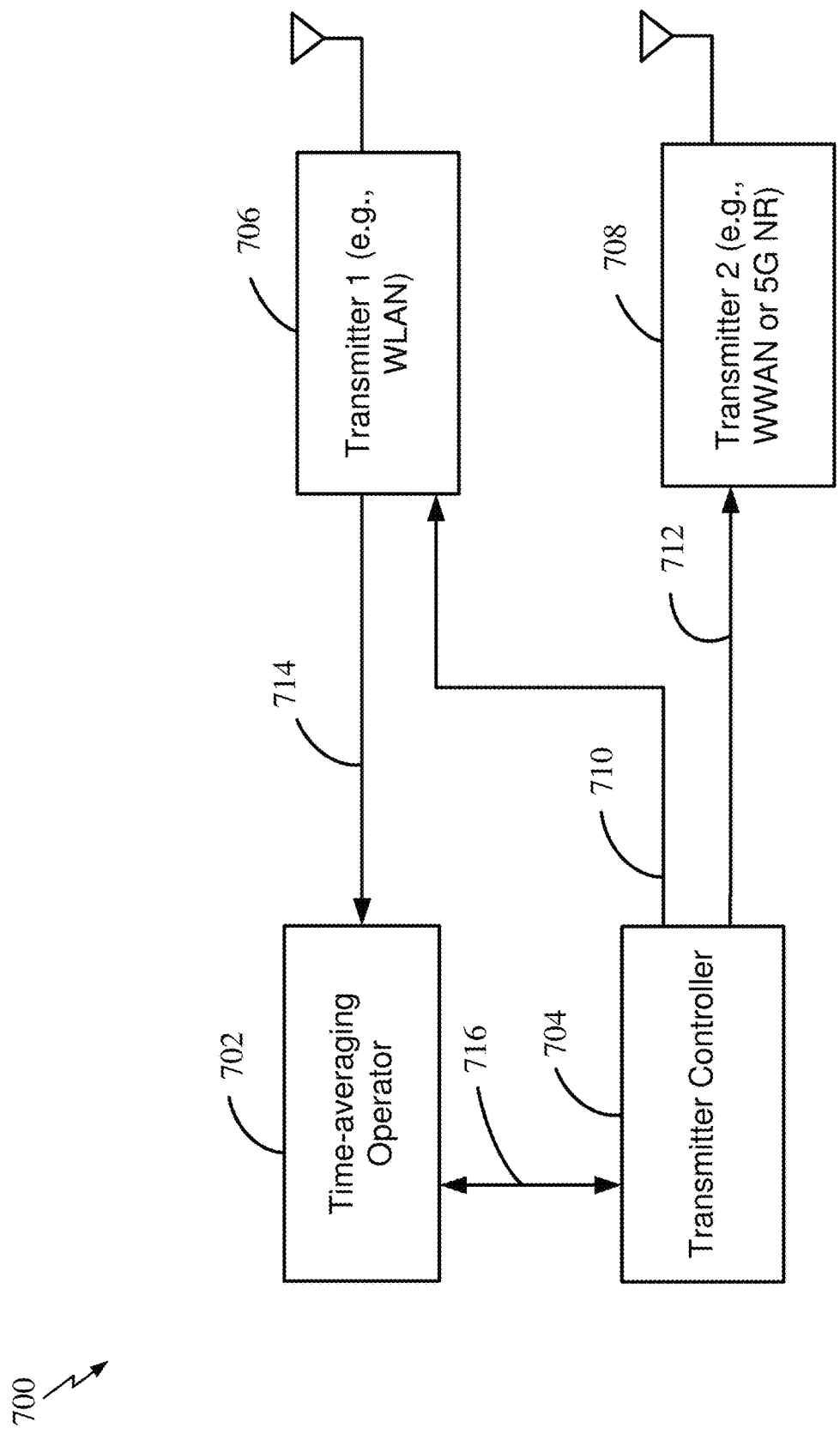
FIG. 7 is an exemplary block diagram of an apparatus for effecting control of transmitters in a wireless device.

FIG. 7 illustrates an exemplary block diagram of an apparatus 700 for effecting control of transmitters in a wireless device, such as the device 100 in FIG. 1. Apparatus 700 includes a time-averaging operator 702, a transmitter controller 704, a first transmitter 706, and a second transmitter 708. For example, the time-averaging operator 702 and the transmitter controller 704 may be implemented by the processor 110, in a separate component, and/or any one or more of the transmitters 120-1 to 120-N. The first transmitter 706 and the second transmitter 708 may be implemented in any one or more of the transmitters 120-1 to 120-N.

The time-averaging operator 702 may constitute hardware or other logic or, alternatively, software running on a specialized processor (not shown), wherein the time-averaging operator 702 is configured to implement a time-averaging operation to effect RF exposure and/or SAR compliance of a transmitter operable according to RF exposure time-averaging technology, such as second transmitter 708 in one example.

The transmitter controller 704 may further be implemented as hardware or logic, or software that is configured to control the transmitters in a wireless device, such as transmitters 706 and 708. The transmitter controller 704 may be implemented within processing circuitry of a wireless device, or in the RF front end componentry of the wireless device. The transmitter controller 704 is communicatively coupled with the transmitters 706 and 708 as represented by couplings 710 and 712, respectively. In certain aspects, the transmitter controller 704 may impose transmission power limits or signal timing limits, among other things, for either of the transmitters 706 and 708, that further may be based on input from the time-averaging operator 702 as will be discussed in further detail below.

According to an aspect, assuming that first transmitter 706 is operable with a non-time-averaged RF exposure technology (e.g., WLAN), information concerning whether the first transmitter 706 is on or off (and may include transmitting frequency information such as 2.4 GHz and 5 GHz band activity) may be provided through a communicative coupling 714 from the transmitter 706 to the time-averaging operator 702. It is noted that information concerning the on/off state of the first transmitter 706 may alternatively be provided from transmitter controller 704 via communicative coupling 716, for example, or from some other components in a wireless device such a main processor or a digital signal processor (DSP) (not shown).

Additionally, in order to implement the RF exposure profile for the non-time-averaged RF exposure technology (e.g., WLAN) discussed in connection with FIGS. 6A and 6B, the time-averaging operator 702 may be configured to send back-off power limits to the first transmitter 706, such as via the transmitter controller 704. In accordance with certain aspects, the time-averaging operator 702 may be configured to limit the first transmitter 706 to a predetermined back-off level (e.g., "x" dB and a $10^{-x/10}$ normalized value) as discussed previously. Additionally, assuming that the second transmitter 708 is a time-averaged RF exposure technology such as WWAN or 5G NR, the time-averaging operator 702 may impose this back-off level when the second transmitter 708 is active and transmitting.

In further aspects, when the second transmitter 708 in this example is in the "off" state, yet the first transmitter 706 is active, the time averaging operator 702 may be configured to assume that the transmit level of the first transmitter 706 is at maximum power to anticipate a worst case scenario to best ensure compliance with RF exposure limits when ultimately calculating transmit power limits for the second transmitter 708 (e.g., a WWAN transmitter) based on or accounting for the transmission by the first transmitter 706 (e.g., a WLAN transmitter). Further, the time-averaging operator 702 may be configured to split between transmissions in the 2.4 GHz or 5 GHz bands as discussed before with respect to FIG. 6B.

Based on the on/off states of the first and second transmitters, the predetermined back-off level of the first transmitter when the second transmitter is active, the assumption of worst-case RF exposure including splitting between different frequency bands, the time-averaging operator 702 and/or the transmitter controller 704 may then dynamically control transmission by the first transmitter 706 in the example of FIG. 7. Specifically, the transmit power of the first transmitter 706, which is operable according to a non-time-averaging technology such as WLAN, is controlled. This affords gaining RF exposure margin, where this increased RF exposure margin, in turn, could be used for transmissions for the second transmitter 708 operable according to a time-averaging technology (e.g., WWAN, 5G NR, etc.). As an example of this benefit, as previously described herein, the traditional approach of splitting the margin between the time-averaged RF exposure of the time-averaged technologies such as WWAN and/or 5G NR being less than or equal to "A" and the RF exposure of non-time-averaged technologies such as WLAN being less than or equal to "B" involves ensuring that the total A+B is less than or equal to 100%. The presently disclosed methods and apparatus allow the value B, for example, to be minimized, allowing the time-averaged technology value "A" to be increased or maximized when active.

Of further note, the apparatus in FIG. 7 may also implement any of the methods of FIGS. 3-5 and the attendant processes therein. For example, the time-averaging operator 702 and the transmitter controller 704 may be used to implement determination and application of the predetermined wait time period or delay such as shown in blocks 306, 308, or 516. Additionally, the time-averaging operator 702 and the transmitter controller 704 may be used to calculate the predetermined time period and implement transmission using time-averaged RF exposure technology at a limited Tx peak power over the predetermined time period as shown in blocks 406 or 508. In yet another example, the time-averaging operator 702 and the transmitter controller 704 may be used to implement the normal time-averaging algorithm and methodology for the time-averaged RF exposure technologies, as well as the processes of returning a transmitter using time-averaged RF exposure technology to power levels determined by the time-averaging algorithm after expiration of predetermined time period as indicated at blocks 410 or 510.

Figure 8:
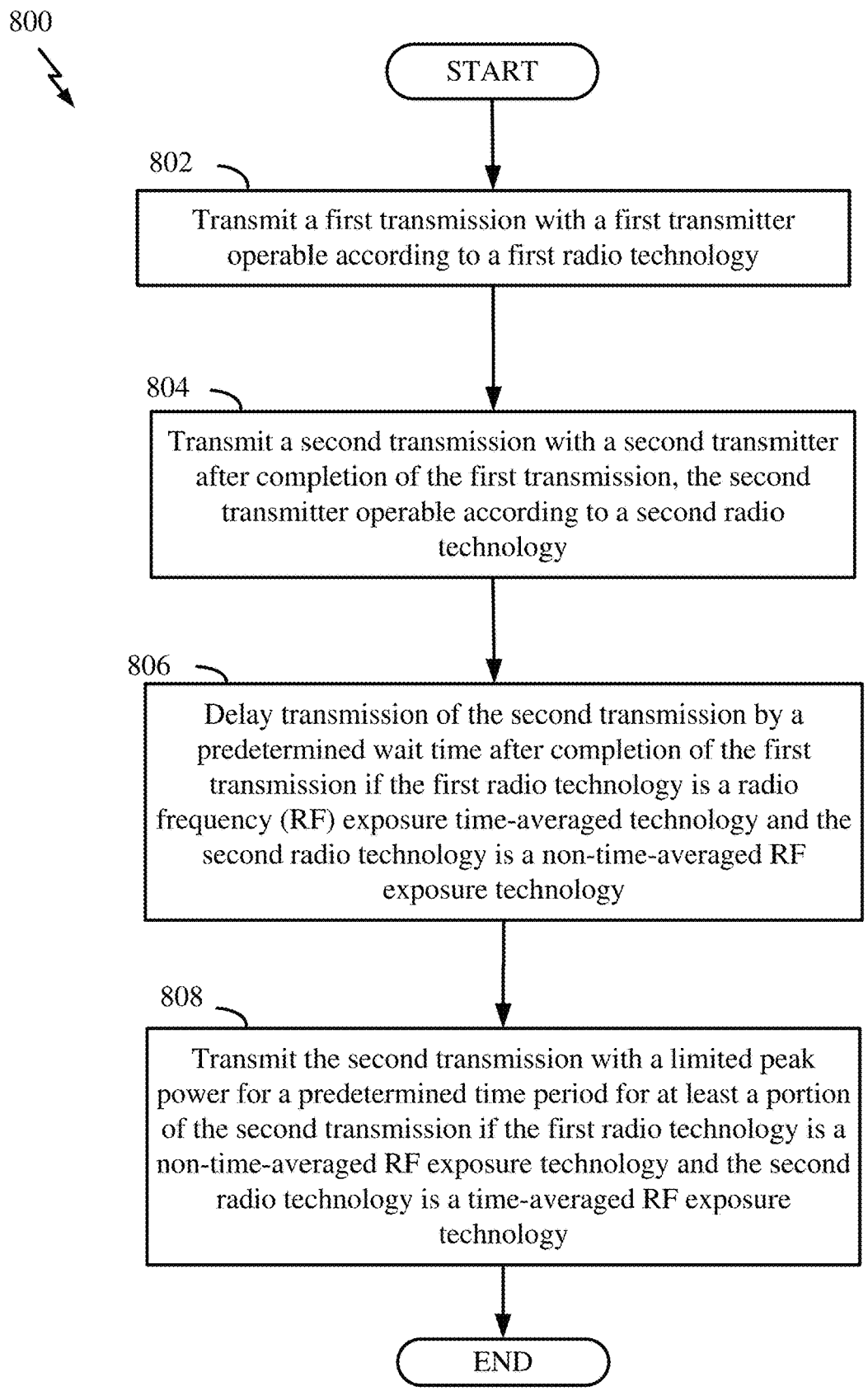
FIG. 8 is a flowchart illustrating an exemplary method for wireless communications according to aspects of the present disclosure.

FIG. 8 illustrates an exemplary method 800 for wireless communication. The method 800 includes transmitting a first transmission with a first transmitter operable according to a first radio technology, as shown in block 802. The first transmitter may correspond to any one or more of the transmitters 120-1 to 120-N, 706 and 708.

The method 800 also includes transmitting a second transmission with a second transmitter after completion of the first transmission, the second transmitter operable according to a second radio technology, as shown in block 804. The second transmitter may correspond to any one or more of the transmitters 120-1 to 120-N, 706 and 708.

The method 800 may also include delaying transmission of the second transmission by a predetermined wait time after completion of the first transmission if the first radio technology is a radio frequency (RF) exposure time-averaged technology and the second radio technology is a non-time-averaged RF exposure technology, as shown in block 806. For example, the second transmission may be delayed by the processor 110, the transmitter controller 704, and/or any one or more of the transmitters 120-1 to 120-N, 706 and 708. The RF exposure time-average technology may include one or more WWAN technologies and 5G new radio (NR) technologies, and the RF exposure non-time-averaged technology may include one or more of a WLAN technology and a Bluetooth technology.

The method 800 may also include transmitting the second transmission with a limited peak power for a predetermined time period for at least a portion of the second transmission if the first radio technology is a non-time-averaged RF exposure technology and the second radio technology is a time-averaged RF exposure technology, as shown in block 808. For example, the second transmission may be transmitted with the limited peak power by the processor 110, the transmitter controller 704, and/or any one or more of the transmitters 120-1 to 120-N, 706 and 708. The RF exposure time-average technology may include one or more WWAN technologies and 5G new radio (NR) technologies, and the RF exposure non-time-averaged technology may include one or more of WLAN technologies and Bluetooth technologies.

Figure 9:
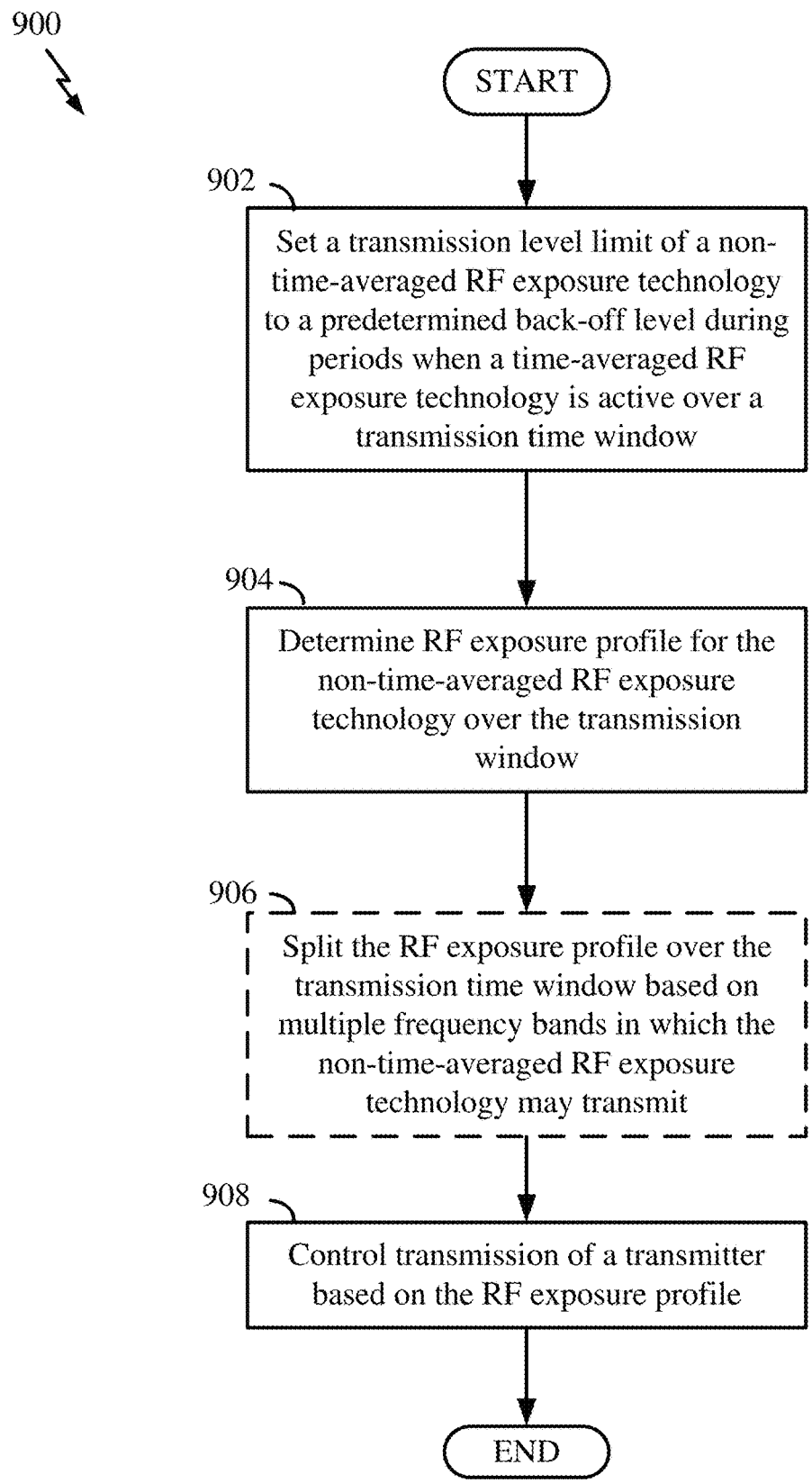
FIG. 9 is a flowchart illustrating an exemplary method for controlling transmissions in a wireless device to ensure compliance with RF exposure limits according to certain aspects of the present disclosure.

FIG. 9 illustrates an exemplary method 900 for controlling transmissions in a wireless device to ensure compliance with RF exposure limits. It is noted that method 900, in particular, provides control of RF transmission by particularly accounting for the RF exposure from transmissions from technologies that are not part of the time-averaging technologies (i.e., the non-time-averaged RF exposure technologies such as WLAN) to gain better overall RF exposure compliance while gaining more of the RF exposure margin.

As shown in block 902, method 900 for controlling transmissions includes setting a limit of the transmission level of a non-time-averaged technology (i.e., a "first radio access technology") equal to a predetermined back-off level when a time-averaged RF exposure technology is active over a transmission time window, such as was discussed above in connection with timeline 604 in FIG. 6A. In a further aspect, the transmission level limit in the process of block 902 may set to a normalize value determined by the relationship $10^{-x/10}$ where "x" is a predetermined back-off level in decibels. The limit of the transmission level may be set, for example, by the processor 110 and/or the transmitter controller 704.

Method 900 further includes determining an RF exposure profile for the non-time-averaged RF exposure technology over the transmission time window as shown at block 904. The determination of the RF exposure profile is based on active transmission periods of the non-time-averaged RF exposure technology over the transmission time window and the determined transmission limit levels during active times of the time-averaged RF exposure technology over the transmission time window. As an example of this determination, the RF exposure profile shown in the timeline 606 of FIG. 6A illustrates that the profile is based on the composite of the active transmission periods of the non-time-averaged technology shown in timeline 602 and the determined level limits for the non-time-averaged RF exposure technology shown in timeline 604 over the transmission time window, which is 100 second past time window in the examples given above, but is not necessarily limited to such. In certain aspects, the RF exposure profile may be determined based on an assumption that the non-time-averaged RF exposure technology (e.g., WLAN) transmits at 100% (e.g., power level corresponding to SAR limit) when the time-averaged RF exposure technology (e.g., WWAN) is not active (i.e., off) and that the non-time-averaged RF exposure technology (e.g., WLAN) transmits at the predetermined back-off level from 100% when the time-averaged RF exposure technology (e.g., WWAN) is active (i.e., on). The RF exposure profile may be determined by the processor 110. The RF exposure profile may be determined, for example, by the processor 110, the time-averaging operator 702, and/or the transmitter controller 704.

In an alternative, method 900 may further include splitting the RF exposure profile over the transmission time window according to frequency bands as shown at block 906. In particular, the RF exposure profile may be split based on frequency bands such as 2.4 GHz and 5.0 GHz as was discussed previously with regard to FIG. 6B (or based on actual knowledge of WLAN transmitting frequency if time-averaging operator receives this information from WLAN transmitter), and illustrated by timelines 646 and 648. The RF exposure profile may be split, for example, by the processor 110, the time-averaging operator 702, and/or the transmitter controller 704.

Finally, method 900 includes, at block 908 controlling transmission of a transmitter based on the RF exposure profile determined in block 904 and/or 906. In certain aspects, controlling the transmission of the transmitter (e.g., transmitter for the time-averaged RF exposure technology) may including setting a transmit power level limit for the transmitter taking into account the RF exposure profile determined in block 904 and/or 906. For example, the processor 110 may combine the RF exposure profile determined in block 904 and/or 906 with an RF exposure profile for the time-averaged RF exposure technology (e.g., WWAN) over the transmission time window to obtain a combined RF exposure profile, and use the combined RF exposure profile to determine the total amount of RF exposure margin (e.g., 206) used by the non-time-averaged RF exposure technology and the time-averaged RF exposure technology and determine a remaining RF exposure margin for RF exposure compliance. The processor 110 may use the remaining RF exposure margin to determine a transmit power level limit for the WWAN transmission that provides RF exposure compliance. The transmission of the transmitter may be controlled, for example, by the processor 110 and/or the transmitter controller 704.

In certain aspects disclosed herein, the processor 110 may assess time-averaged RF exposure compliance by computing a time-averaged SAR distribution over an averaged time window (e.g., 60 seconds, 100 seconds, 6 minutes, 30 minutes, etc.), and then compare the peak value in the time-averaged SAR distribution with the RF exposure limit to assess time-averaged RF exposure compliance. If the peak value is equal to or less than the RF exposure limit, then the processor 110 may determine time-averaged RF exposure compliance. If the time-averaged SAR distribution is normalized, then the RF exposure limit may be one.

It is to be appreciated that the processor 110 is not limited to the above example for assessing time-averaged RF exposure compliance. For example, the processor 110 may assess time-averaged RF exposure compliance (e.g., at a single location) by computing a time-averaged SAR value (e.g., at the location) over an averaged time window, and then comparing the time-averaged SAR value with the RF exposure limit to assess time-averaged RF exposure compliance. If the time-averaged SAR value is equal to or less than the RF exposure limit, then the processor 110 may determine time-averaged RF exposure compliance. It is also be appreciated that the processor 110 may also assess RF exposure based on power density (PD) and/or a combination of SAR and PD. Therefore, it is to be understand that the processor 110 is not limited to a particular type of RF exposure measurement for assessing time-averaged RF exposure, and may use other types of RF exposure measurements.

Although aspects of the present disclosure are discussed above using the example of WLAN as a non-time-averaged RF exposure technology and the example of WWAN as a time-averaged RF exposure technologies, it is to be understand that aspects of the present disclosure are more generally applicable to non-time-averaged RF exposure technologies and time-averaged RF exposure technologies. More particularly, aspects discussed above using the example of WLAN as a non-time-averaged RF exposure technology apply generally to other non-time-averaged RF exposure technologies (e.g., Bluetooth technologies) and aspects discussed above using the example of WWAN as a time-averaged RF exposure technology apply generally to other time-averaged RF exposure technologies. In yet other examples, WWAN may be operated as a non-time-averaged technology and WLAN and/or Bluetooth may be operated as a time-averaged technology.

In other certain aspects, the memory 115 may include a computer readable medium including instructions stored thereon that, when executed by the processor 110, cause the processor 110 to perform the methods and operations described herein. The computer readable medium may include, by way of example, RAM (Random Access Memory), flash memory, ROM (Read Only Memory), PROM (Programmable Read-Only Memory). EPROM (Erasable Programmable Read-Only Memory), EEPROM (Electrically Erasable Programmable Read-Only Memory), registers, magnetic disks, optical disks, hard drives, or any other tangible non-transitory storage medium, or any combination thereof.

Implementation examples are described in the following numbered clauses:

1. A wireless device, comprising:
   multiple transmitters including a first transmitter and a second transmitter, wherein each of the multiple transmitters is configured to transmit signals according to a respective radio technology of multiple radio technologies, and wherein the multiple radio technologies include a first radio technology comprising a time-averaged radio frequency (RF) exposure technology and a second radio technology comprising a non-time-averaged RF exposure technology; and
   a processor coupled to the multiple transmitters, wherein the processor is configured to:
   cause the first transmitter to transmit a first transmission;
   cause the second transmitter to transmit a second transmission after completion of the first transmission;
   cause the second transmitter to transmit the second transmission subsequent to completion of a predetermined wait time after the completion of the first transmission if the first transmitter is operable according to the first radio technology and the second transmitter is operable according to the second radio technology; and
   cause the second transmitter to transmit at least a portion of the second transmission with a limited peak power for a predetermined time period after the completion of the first transmission if the first transmitter is operable according to the second radio technology and the second transmitter is operable according to the first radio technology.
2. The wireless device of clause 1, wherein the processor is further configured to determine the predetermined wait time based on an amount of RF exposure resulting from the first transmission by the first transmitter.
3. The wireless device of clause 1 or 2, wherein the processor is further configured to determine the predetermined time period based on an amount of RF exposure resulting from the first transmission by the first transmitter.
4. The wireless device of any one of clauses 1 to 3, wherein the processor is configured to cause the second transmitter to transmit according the first radio technology at normal power levels determined by time-averaging after expiration of the predetermined time period.
5. The wireless device of any one of clauses 1 to 4, wherein the first radio technology comprises one or more of wireless wide area network (WWAN) technologies and 5G new radio (NR) technologies and the second radio technology comprises one or more of wireless local area network (WLAN) technologies and Bluetooth technologies.
6. The wireless device of any one of clauses 1 to 5, wherein the processor is further configured to:
   receive information concerning on and off states of a transmitter operable according to the second radio technology; and
   set transmit power limits for one or more transmitters operable according to the first radio technology based on the information concerning the on and off states of the transmitter operable according to the second radio technology.
7. The wireless device of clause 6, wherein the processor is further configured to: determine a history of the transmitter operable according to the second radio technology based on the received information concerning the on and off states of the transmitter operable according to the second radio technology; and
   adjust at least one of the transmit power levels and the predetermined time period for the one or more transmitters operable according to the first radio technology based on the determined history.
8. A method for wireless communications, comprising:
   transmitting a first transmission with a first transmitter operable according to a first radio technology;
   transmitting a second transmission with a second transmitter after completion of the first transmission, the second transmitter operable according to a second radio technology;
   delaying transmission of the second transmission by a predetermined wait time after completion of the first transmission if the first radio technology is a radio frequency (RF) exposure time-averaged technology and the second radio technology is a non-time-averaged RF exposure technology; and
   transmitting the second transmission with a limited peak power for a predetermined time period for at least a portion of the second transmission if the first radio technology is a non-time-averaged RF exposure technology and the second radio technology is a time-averaged RF exposure technology.
9. The method of clause 8, further comprising determining the predetermined wait time based on an amount of RF exposure resulting from the first transmission by the first transmitter when the first radio technology comprises the time-averaged RF exposure technology.
10. The method of clause 8 or 9, further comprising determining the predetermined time period based on an amount of RF exposure resulting from the first transmission by the first transmitter when the first radio technology comprises the non-time-averaged RF exposure technology.

11. The method of any one of clauses 8 to 10, further comprising transmitting at least a portion of the second transmission with the second transmitter when the second radio technology is the time-averaged RF exposure technology at normal power levels as determined by time-averaging after expiration of the predetermined time period.

12. The method of any one of clauses 8 to 11, wherein the time-averaged RF exposure technology comprises one or more of wireless wide area network (WWAN) technologies and 5G new radio (NR) technologies and the radio frequency (RF) exposure non-time-averaged technology comprises one or more of wireless local area network (WLAN) technologies and Bluetooth technologies.

13. The method of any one of clauses 8 to 12, further comprising:
receiving information concerning on and off states of a transmitter operable according to the non-time-averaged RF exposure technology; and
setting transmit power limits for one or more transmitters operable according to the time-averaged RF exposure technology based on the information concerning the on and off states of the transmitter operable according to the non-time-averaged RF exposure technology.

14. The method of clause 13, further comprising:
determining a history of the transmitter operable according the non-time-averaged RF exposure technology based on the received information concerning the on and off states of the transmitter operable according to the second radio technology; and
adjusting at least one of the transmit power levels and the predetermined time period for transmitters operable according to the time-averaged RF exposure technology based on the determined history.

15. A wireless device, comprising:
multiple transmitters, wherein each of the multiple transmitters is configured to transmit signals according to a respective radio technology of multiple radio technologies, and wherein the multiple radio technologies include a time-averaged radio frequency (RF) exposure technology and a non-time-averaged RF exposure technology; and
a processor coupled to the multiple transmitters, wherein the processor is configured to:
set a transmission level limit of the non-time-averaged RF exposure technology to a predetermined back-off level during periods when the time-averaged RF exposure technology is active over a transmission time window;
determine an RF exposure profile for the non-time-averaged RF exposure technology over the transmission time window; and
control transmission of one of the transmitters operable according to the time-averaged RF exposure technology based on the RF exposure profile.

16. The wireless device of clause 15, wherein the non-time-averaged RF exposure technology transmits using multiple frequency bands, and the processor is further configured to split the RF exposure profile over the transmission time window based on the multiple frequency bands.

17. The wireless device of clause 16, wherein the multiple frequency bands include a 2.4 GHz band and 5.0 GHz band.

18. The wireless device of clause 16 or 17, wherein the RF exposure profile is split into first and second portions that respectively correspond to a first and second time portions of the transmission time window.

19. The wireless device of clause 18, wherein the RF exposure profile is split into the first and second portions based on the received information of active frequency bands of the non-time-averaged RF exposure technology.

20. The wireless device of any one of clauses 15 to 19, wherein the processor is further configured to determine the predetermined back-off level based on a relationship $10^{-x/10}$ where x is a back-off value in decibels.

21. The wireless device of any one of clauses 15 to 20, wherein the processor is further configured to determine the RF exposure profile by assuming that the set transmission level limit during non-active periods of the time-averaged RF exposure technology is a maximum transmit power.

22. The wireless device of any one of clauses 15 to 21, wherein the time-averaged RF exposure technology comprises one or more of wireless wide area network (WWAN) technologies and 5G new radio (NR) technologies and the non-time-averaged RF exposure technology comprises one or more of wireless local area network (WLAN) technologies and Bluetooth technologies.

23. The wireless device of any one of clauses 15 to 22, wherein the processor is further configured to:
receive information concerning on and off states of the transmitter operable according to the non-time-averaged RF exposure technology; and
determine the RF exposure profile for the non-time-averaged RF exposure technology further based on the received information concerning the on and off states.

24. The wireless device of clause 23, wherein the RF exposure profile is split into first and second portions based on the received information of active frequency bands of the non-time-averaged RF exposure technology.

25. The wireless device of any one of clauses 15 to 24, wherein the processor is configured to set the transmission level limit of the non-time-averaged RF exposure technology to a power level during periods when the time-averaged RF exposure technology is non active over the transmission time window, and the back-off level is equal to the power level reduced by a back-off value.

26. A method for wireless communications, comprising:
setting a transmission level limit of a non-time-averaged RF exposure technology to a predetermined back-off level during periods when a time-averaged RF exposure technology is active over a transmission time window;
determining an RF exposure profile for the non-time-averaged RF exposure technology over the transmission time window; and
controlling transmission of a transmitter operable according to the time-averaged RF exposure technology based on the derived RF exposure profile.

27. The method of clause 26, further comprising splitting the RF exposure profile over the transmission time window based on multiple frequency bands in which the non-time-averaged RF exposure technology may transmit.

28. The method of clause 27, wherein the multiple frequency bands include a 2.4 GHz band and 5.0 GHz band.

29. The method of clause 27 or 28, wherein the RF exposure profile is split into first and second portions that respectively correspond to first and second time portions of the transmission time window.

30. The method of any one of clauses 26 to 29, further comprising determining the predetermined back-off level based on the relationship $10^{-x/10}$ where x is a back-off value in decibels.

31. The method of any one of clauses 26 to 30, wherein determining the RF exposure profile includes assuming that the set transmission level limit during active periods of the time-averaged RF exposure technology is a maximum transmit power.

32. The method of any one of clauses 26 to 31, wherein the time-averaged RF exposure technology comprises one or more of wireless wide area network (WWAN) technologies and 5G new radio (NR) technologies and the non-time-averaged RF exposure technology comprises one or more of wireless local area network (WLAN) technologies and Bluetooth technologies.

33. The method of any one of clauses 26 to 32, further comprising:
receiving information concerning on and off states of the transmitter operable according to the non-time-averaged RF exposure technology; and
determining the RF exposure profile for the non-time-averaged RF exposure technology further based on the received information concerning the on and off states.

34. The method of clause 33, wherein the RF exposure profile is split into first and second portions based on the received information of active frequency bands of the non-time-averaged RF exposure technology.

35. The method of any one of clauses 26 to 34, further comprising setting the transmission level limit of the non-time-averaged RF exposure technology to a power level during periods when the time-averaged RF exposure technology is non active over the transmission time window, and the back-off level is equal to the power level reduced by a back-off value.

It is to be appreciated that the present disclosure is not limited to the exemplary terms used above to describe aspects of the present disclosure, and that the present disclosure covers equivalent terms. For example, it is to be appreciated that a distribution may also be referred to as a map, a scan, or another term. In another example, it is to be appreciated that an antenna may also be referred to as an antenna element or another term. In yet another example it is to be appreciated that a maximum allowable power level may also be referred to as a power level limit or another term.

The term "approximately", as used herein with respect to a stated value or a property, is intended to indicate being within 10% of the stated value or property.

Any reference to an element herein using a designation such as "first." "second." and so forth does not generally limit the quantity or order of those elements. Rather, these designations are used herein as a convenient way of distinguishing between two or more elements or instances of an element. Thus, a reference to first and second elements does not mean that only two elements can be employed, or that the first element must precede the second element.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A wireless device, comprising:
multiple transmitters including a first transmitter and a second transmitter, wherein each of the multiple transmitters is configured to transmit signals according to a respective radio technology of multiple radio technologies, and wherein the multiple radio technologies include a first radio technology comprising a time-averaged radio frequency (RF) exposure technology and a second radio technology comprising a non-time-averaged RF exposure technology; and
a processor coupled to the multiple transmitters, wherein the processor is configured to:
cause the first transmitter to transmit a first transmission;
cause the second transmitter to transmit a second transmission after completion of the first transmission;
cause the second transmitter to transmit the second transmission subsequent to completion of a predetermined wait time after the completion of the first transmission if the first transmitter is operable according to the first radio technology and the second transmitter is operable according to the second radio technology; and
cause the second transmitter to transmit at least a portion of the second transmission with a limited peak power for a predetermined time period after the completion of the first transmission if the first transmitter is operable according to the second radio technology and the second transmitter is operable according to the first radio technology,
wherein the wireless device is configured to cause all transmissions according to the second radio technology to be at or below a specific absorption rate (SAR) limit specified by a regulator for averaging RF exposure for the second radio technology.

2. The wireless device of claim 1, wherein the processor is further configured to determine the predetermined wait time based on an amount of RF exposure resulting from the first transmission by the first transmitter.

3. The wireless device of claim 1, wherein the processor is further configured to determine the predetermined time period based on an amount of RF exposure resulting from the first transmission by the first transmitter.

4. The wireless device of claim 1, wherein the processor is configured to cause the second transmitter to transmit according the first radio technology at normal power levels determined by time-averaging after expiration of the predetermined time period.

5. The wireless device of claim 1, wherein the first radio technology comprises one or more of wireless wide area network (WWAN) technologies and 5G new radio (NR) technologies and the second radio technology comprises one or more of wireless local area network (WLAN) technologies and Bluetooth technologies.

6. The wireless device of claim 1, wherein the processor is further configured to:
receive information concerning on and off states of a transmitter operable according to the second radio technology; and
set transmit power limits for one or more transmitters operable according to the first radio technology based on the information concerning the on and off states of the transmitter operable according to the second radio technology.

7. The wireless device of claim 6, wherein the processor is further configured to:
  determine a history of the transmitter operable according to the second radio technology based on the received information concerning the on and off states of the transmitter operable according to the second radio technology; and
  adjust at least one of the transmit power levels and the predetermined time period for the one or more transmitters operable according to the first radio technology based on the determined history.

8. A method for wireless communications, comprising:
  transmitting a first transmission with a first transmitter operable according to a first radio technology;
  transmitting a second transmission with a second transmitter after completion of the first transmission, the second transmitter operable according to a second radio technology;
  delaying transmission of the second transmission by a predetermined wait time after completion of the first transmission if the first radio technology is a radio frequency (RF) exposure time-averaged technology and the second radio technology is a non-time-averaged RF exposure technology; and
  transmitting the second transmission with a limited peak power for a predetermined time period for at least a portion of the second transmission if the first radio technology is a non-time-averaged RF exposure technology and the second radio technology is a time-averaged RF exposure technology,
  wherein transmissions according to the second radio technology are always at or below a specific absorption rate (SAR) limit specified by a regulator for averaging RF exposure for the second radio technology.

9. The method of claim 8, further comprising determining the predetermined wait time based on an amount of RF exposure resulting from the first transmission by the first transmitter when the first radio technology comprises the time-averaged RF exposure technology.

10. The method of claim 8, further comprising determining the predetermined time period based on an amount of RF exposure resulting from the first transmission by the first transmitter when the first radio technology comprises the non-time-averaged RF exposure technology.

11. The method of claim 8, further comprising transmitting at least a portion of the second transmission with the second transmitter when the second radio technology is the time-averaged RF exposure technology at normal power levels as determined by time-averaging after expiration of the predetermined time period.

12. The method of claim 8, wherein the time-averaged RF exposure technology comprises one or more of wireless wide area network (WWAN) technologies and 5G new radio (NR) technologies and the non-time-averaged RF exposure technology comprises one or more of wireless local area network (WLAN) technologies and Bluetooth technologies.

13. The method of claim 8, further comprising:
  receiving information concerning on and off states of a transmitter operable according to the non-time-averaged RF exposure technology; and
  setting transmit power limits for one or more transmitters operable according to the time-averaged RF exposure technology based on the information concerning the on and off states of the transmitter operable according to the non-time-averaged RF exposure technology.

14. The method of claim 13, further comprising:
  determining a history of the transmitter operable according the non-time-averaged RF exposure technology based on the received information concerning the on and off states of the transmitter operable according to the second radio technology; and
  adjusting at least one of the transmit power levels and the predetermined time period for transmitters operable according to the time-averaged RF exposure technology based on the determined history.

15. A wireless device, comprising:
  multiple transmitters, wherein each of the multiple transmitters is configured to transmit signals according to a respective radio technology of multiple radio technologies, and wherein the multiple radio technologies include a time-averaged radio frequency (RF) exposure technology and a non-time-averaged RF exposure technology; and
  a processor coupled to the multiple transmitters, wherein the processor is configured to:
    set a transmission level limit of the non-time-averaged RF exposure technology to a predetermined back-off level during periods when the time-averaged RF exposure technology is active over a transmission time window;
    determine an RF exposure profile for the non-time-averaged RF exposure technology over the transmission time window; and
    control transmission of one of the transmitters operable according to the time-averaged RF exposure technology based on the RF exposure profile, wherein
    the processor is further configured to determine the predetermined back-off level based on a relationship $10^{-x/10}$ where x is a back-off value in decibels, or
    the processor is configured to set the transmission level limit of the non-time-averaged RF exposure technology to a power level during periods when the time-averaged RF exposure technology is non active over the transmission time window, and the back-off level is equal to the power level reduced by a back-off value.

16. The wireless device of claim 15, wherein the non-time-averaged RF exposure technology transmits using multiple frequency bands, and the processor is further configured to split the RF exposure profile over the transmission time window based on the multiple frequency bands.

17. The wireless device of claim 16, wherein the multiple frequency bands include a 2.4 GHz band and 5.0 GHz band.

18. The wireless device of claim 16, wherein the RF exposure profile is split into first and second portions that respectively correspond to a first and second time portions of the transmission time window.

19. The wireless device of claim 18, wherein the RF exposure profile is split into the first and second portions based on received information of active frequency bands of the non-time-averaged RF exposure technology.

20. The wireless device of claim 15, wherein the processor is further configured to determine the RF exposure profile by assuming that the set transmission level limit during non-active periods of the time-averaged RF exposure technology is a maximum transmit power.

21. The wireless device of claim 15, wherein the time-averaged RF exposure technology comprises one or more of wireless wide area network (WWAN) technologies and 5G new radio (NR) technologies and the non-time-averaged RF exposure technology comprises one or more of wireless local area network (WLAN) technologies and Bluetooth technologies.

22. The wireless device of claim 15, wherein the processor is further configured to:
  receive information concerning on and off states of a transmitter operable according to the non-time-averaged RF exposure technology; and
  determine the RF exposure profile for the non-time-averaged RF exposure technology further based on the received information concerning the on and off states.

23. The wireless device of claim 22, wherein the RF exposure profile is split into first and second portions based on received information of active frequency bands of the non-time-averaged RF exposure technology.

24. A method for wireless communications, comprising:
  setting a transmission level limit of a non-time-averaged RF exposure technology to a predetermined back-off level during periods when a time-averaged RF exposure technology is active over a transmission time window;
  determining an RF exposure profile for the non-time-averaged RF exposure technology over the transmission time window; and
  controlling transmission of a transmitter operable according to the time-averaged RF exposure technology based on the RF exposure profile,
  wherein the method further comprises
    determining the predetermined back-off level based on the relationship $10^{-x/10}$ where x is a back-off value in decibels, or
    setting the transmission level limit of the non-time-averaged RF exposure technology to a power level during periods when the time-averaged RF exposure technology is non active over the transmission time window, and the back-off level is equal to the power level reduced by a back-off value.

25. The method of claim 24, further comprising splitting the RF exposure profile over the transmission time window based on multiple frequency bands in which the non-time-averaged RF exposure technology may transmit.

26. The method of claim 24, wherein determining the RF exposure profile includes assuming that the set transmission level limit during active periods of the time-averaged RF exposure technology is a maximum transmit power.

* * * * *